US008415564B2

(12) United States Patent
Seraj et al.

(10) Patent No.: US 8,415,564 B2
(45) Date of Patent: Apr. 9, 2013

(54) WRAP-AROUND CABLE SLEEVE ASSEMBLIES AND METHODS FOR MAKING AND USING THE SAME

(75) Inventors: Mahmoud K. Seraj, Apex, NC (US); George W. Pullium, III, Garner, NC (US); Kathryn Marie Maher, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 353 days.

(21) Appl. No.: 12/730,727

(22) Filed: Mar. 24, 2010

(65) Prior Publication Data

US 2011/0100671 A1 May 5, 2011

Related U.S. Application Data

(60) Provisional application No. 61/258,105, filed on Nov. 4, 2009.

(51) Int. Cl.
*H02G 15/02* (2006.01)
*H01R 4/00* (2006.01)
*H01B 9/02* (2006.01)
*H01B 3/30* (2006.01)

(52) U.S. Cl. .................. 174/74 A; 174/93; 174/102 R; 174/110 R; 156/53; 156/213

(58) Field of Classification Search .............. 174/68.1, 174/93, 74 A, 102 R, 110 R
See application file for complete search history.

(56) References Cited

U.S. PATENT DOCUMENTS

| 3,801,730 | A | | 4/1974 | Nakata et al. |
| 3,839,595 | A | * | 10/1974 | Yonkers ........................ 174/87 |
| 4,268,329 | A | | 5/1981 | Jervis |
| 4,323,174 | A | * | 4/1982 | Wood ......................... 222/146.2 |
| 4,498,938 | A | | 2/1985 | Moisson et al. |
| 4,801,651 | A | * | 1/1989 | Komatsu et al. .............. 525/195 |

(Continued)

FOREIGN PATENT DOCUMENTS

| DE | G 81 30 116.2 | 3/1985 |
| DE | 90 01 931 U1 | 4/1990 |

(Continued)

OTHER PUBLICATIONS

"[Untranslated Japanese language title] PST", 3M, date unknown; 4 pages.

(Continued)

*Primary Examiner* — Zachary M Pape
*Assistant Examiner* — Binh Tran
(74) *Attorney, Agent, or Firm* — Myers Bigel Sibley & Sajovec, PA

(57) ABSTRACT

A wrap-around cable sleeve assembly for environmentally sealing a cable section includes a wrap-around sleeve and a cable mastic patch. The wrap-around sleeve has a longitudinally extending portion and opposed first and second longitudinal edges. The longitudinally extending portion defines a portion of a cable chamber extending around the cable section when the wrap-around sleeve is wrapped around the cable section. The cable mastic patch is disposed on an interior surface of the longitudinally extending portion and extends transversely across the longitudinally extending portion. The cable mastic patch is configured and positioned to engage the cable section and form a continuous environmental circumferential seal about the cable section when the wrap-around sleeve is wrapped around the cable section.

23 Claims, 18 Drawing Sheets

U.S. PATENT DOCUMENTS

| | | | |
|---|---|---|---|
| 4,880,676 A | 11/1989 | Puigcerver et al. | |
| 4,888,070 A | 12/1989 | Clark et al. | |
| 4,944,976 A | 7/1990 | Plummer, III | |
| 5,099,088 A | 3/1992 | Usami et al. | |
| 5,298,301 A | 3/1994 | Midgley et al. | |
| 5,456,959 A | 10/1995 | Dawes | |
| 5,505,230 A | 4/1996 | Bartholomew | |
| 5,561,269 A | 10/1996 | Robertson et al. | |
| 5,824,954 A | 10/1998 | Biche et al. | |
| 5,824,956 A | 10/1998 | Garban et al. | |
| 5,828,005 A | 10/1998 | Huynh-Ba et al. | |
| 5,962,811 A | 10/1999 | Rodrigues et al. | |
| 6,094,792 A | 8/2000 | Frye et al. | |
| 6,195,861 B1 | 3/2001 | Frye et al. | |
| 6,219,907 B1 | 4/2001 | Frye | |
| 6,265,665 B1 | 7/2001 | Zahnen | |
| 6,399,659 B2 | 6/2002 | Usui et al. | |
| 6,520,800 B1 | 2/2003 | Michelbach et al. | |
| 6,545,219 B1 | 4/2003 | Bukovnik et al. | |
| 6,706,968 B2 * | 3/2004 | Yaworski et al. | 174/74 A |
| 6,730,847 B1 * | 5/2004 | Fitzgerald et al. | 174/77 R |
| 7,072,188 B2 | 7/2006 | Janisch | |
| 7,197,816 B1 | 4/2007 | Frye | |
| 2002/0166691 A1 | 11/2002 | Yaworski et al. | |
| 2003/0207620 A1 | 11/2003 | Haas et al. | |
| 2006/0037687 A1 * | 2/2006 | Buekers et al. | 156/53 |
| 2009/0283294 A1 * | 11/2009 | Bukovnik | 174/102 R |

FOREIGN PATENT DOCUMENTS

| | | |
|---|---|---|
| DE | G90 04 669 | 8/1990 |
| EP | 0 319 305 A2 | 6/1989 |
| EP | 0 319 305 A3 | 6/1989 |
| EP | 0 328 386 A2 | 8/1989 |
| EP | 0 409 444 A2 | 1/1991 |
| EP | 0 443 152 A1 | 8/1991 |
| EP | 0 695 014 A1 | 1/1996 |
| EP | 1 997 861 A2 | 12/2008 |
| FR | 2 278 183 | 7/1975 |
| GB | 1 506 748 | 4/1978 |
| WO | WO 01/82435 A2 | 11/2001 |

OTHER PUBLICATIONS

"Aerosols & Coatings", 3M Electrical Products Division, p. 39, date unknown.

"Motor Lead Connections (5300 Series)", 3M, pp. 287-290, date unknown.

"Motor Lead Splicing", 3M Electrical Products Division, p. 72, date unknown.

"Motor Stub Splice Insulator", T&B, pp. D124, D125 and D127, date unknown.

"Splice Insulators", T&B, pp. M195 and M196, Jan. 21, 1985.

"Termination, Splicing and Marking", Wesco, p. 5-10, 1993.

Notification of Transmittal of the International Search Report and the Written Opinion of the International Searching Authority, or the Declaration in corresponding PCT Application No. PCT/US2010/052250 mailed Jan. 27, 2012 (10 pages).

Notification Concerning Transmittal of International Preliminary Report on Patentability in corresponding PCT Application No. PCT/US2010/052250 mailed May 18, 2012 (6 pages).

* cited by examiner

WRAP-AROUND CABLE SLEEVE ASSEMBLIES AND METHODS FOR MAKING AND USING THE SAME

RELATED APPLICATION(S)

The present application claims the benefit of and priority from U.S. Provisional Patent Application Ser. No. 61/258,105, filed Nov. 4, 2009, the disclosure of which is incorporated herein by reference.

FIELD OF THE INVENTION

This invention relates to sealing of cables. More particularly, this invention relates to wrap-around cable sleeves.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

SUMMARY OF THE INVENTION

According to embodiments of the present invention, a wrap-around cable sleeve assembly for environmentally sealing a cable section includes a wrap-around sleeve and a cable mastic patch. The wrap-around sleeve has a longitudinally extending portion and opposed first and second longitudinal edges. The longitudinally extending portion defines a portion of a cable chamber extending around the cable section when the wrap-around sleeve is wrapped around the cable section. The cable mastic patch is disposed on an interior surface of the longitudinally extending portion and extends transversely across the longitudinally extending portion. The cable mastic patch is configured and positioned to engage the cable section and form a continuous environmental circumferential seal about the cable section when the wrap-around sleeve is wrapped around the cable section.

According to method embodiments of the present invention, a method for forming a protected cable assembly to environmentally seal a cable section includes providing a wrap-around cable sleeve assembly. The wrap-around cable sleeve assembly includes a wrap-around sleeve and a cable mastic patch. The wrap-around sleeve has a longitudinally extending portion and opposed first and second longitudinal edges. The cable mastic patch is disposed on an interior surface of the longitudinally extending portion and extends transversely across the longitudinally extending portion. The method further includes wrapping the wrap-around sleeve around the cable section such that the longitudinally extending portion defines a portion of a cable chamber extending around the cable section and the cable mastic patch engages the cable section and forms a continuous environmental circumferential seal about the cable section.

According to method embodiments of the present invention, a method for forming a wrap-around cable sleeve assembly for environmentally sealing a cable section includes: providing a wrap-around sleeve having a longitudinally extending portion and opposed first and second longitudinal edges, wherein the longitudinally extending portion defines a portion of a cable chamber extending around the cable section when the wrap-around sleeve is wrapped around the cable section; and placing a cable mastic patch on an interior surface of the longitudinally extending portion and extending transversely across the longitudinally extending portion, wherein the cable mastic patch is configured and positioned to engage the cable section and form a continuous environmental circumferential seal about the cable section when the wrap-around sleeve is wrapped around the cable section.

According to embodiments of the present invention, a cable covering system for environmentally sealing a cable section includes a wrap-around cable sleeve assembly and a supplemental compression system. The wrap-around cable sleeve assembly includes a wrap-around sleeve and a cable sealant patch. The wrap-around sleeve has a longitudinally extending portion and opposed first and second longitudinal edges. The longitudinally extending portion defines a portion of a cable chamber extending around the cable section when the wrap-around sleeve is wrapped around the cable section. The cable sealant patch is disposed on an interior surface of the longitudinally extending portion and extends transversely across the longitudinally extending portion. The cable sealant patch is configured and positioned to engage the cable section and form a continuous environmental circumferential seal about the cable section when the wrap-around sleeve is wrapped around the cable section. The supplemental compression system includes a compression member and an anchor member. The compression member is installable about the wrap-around sleeve when the wrap-around sleeve is wrapped around the cable section to apply a radially inward compression load to the cable sealant patch. The anchor member is positionable on the wrap-around sleeve. The anchor member is configured to mechanically engage the wrap-around sleeve and the compression member to limit relative movement between the wrap-around sleeve and the compression member.

According to embodiments of the present invention, a cable covering system for environmentally sealing a cable section includes a wrap-around cable sleeve assembly and a supplemental compression system. The wrap-around cable sleeve assembly includes a wrap-around sleeve and a cable sealant patch. The wrap-around sleeve has a longitudinally extending portion and opposed first and second longitudinal edges. The longitudinally extending portion defines a portion of a cable chamber extending around the cable section when the wrap-around sleeve is wrapped around the cable section. The cable sealant patch is disposed on an interior surface of the longitudinally extending portion and extends transversely across the longitudinally extending portion. The cable sealant patch is configured and positioned to engage the cable section and form a continuous environmental circumferential seal about the cable section when the wrap-around sleeve is wrapped around the cable section. The supplemental compression system includes an elastic compression member installable about the wrap-around sleeve when the wrap-around sleeve is wrapped around the cable section to apply a radially inward compression load to the cable sealant patch.

Further features, advantages and details of the present invention will be appreciated by those of ordinary skill in the art from a reading of the figures and the detailed description of the embodiments that follow, such description being merely illustrative of the present invention.

DETAILED DESCRIPTION OF THE EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

Figure 6:
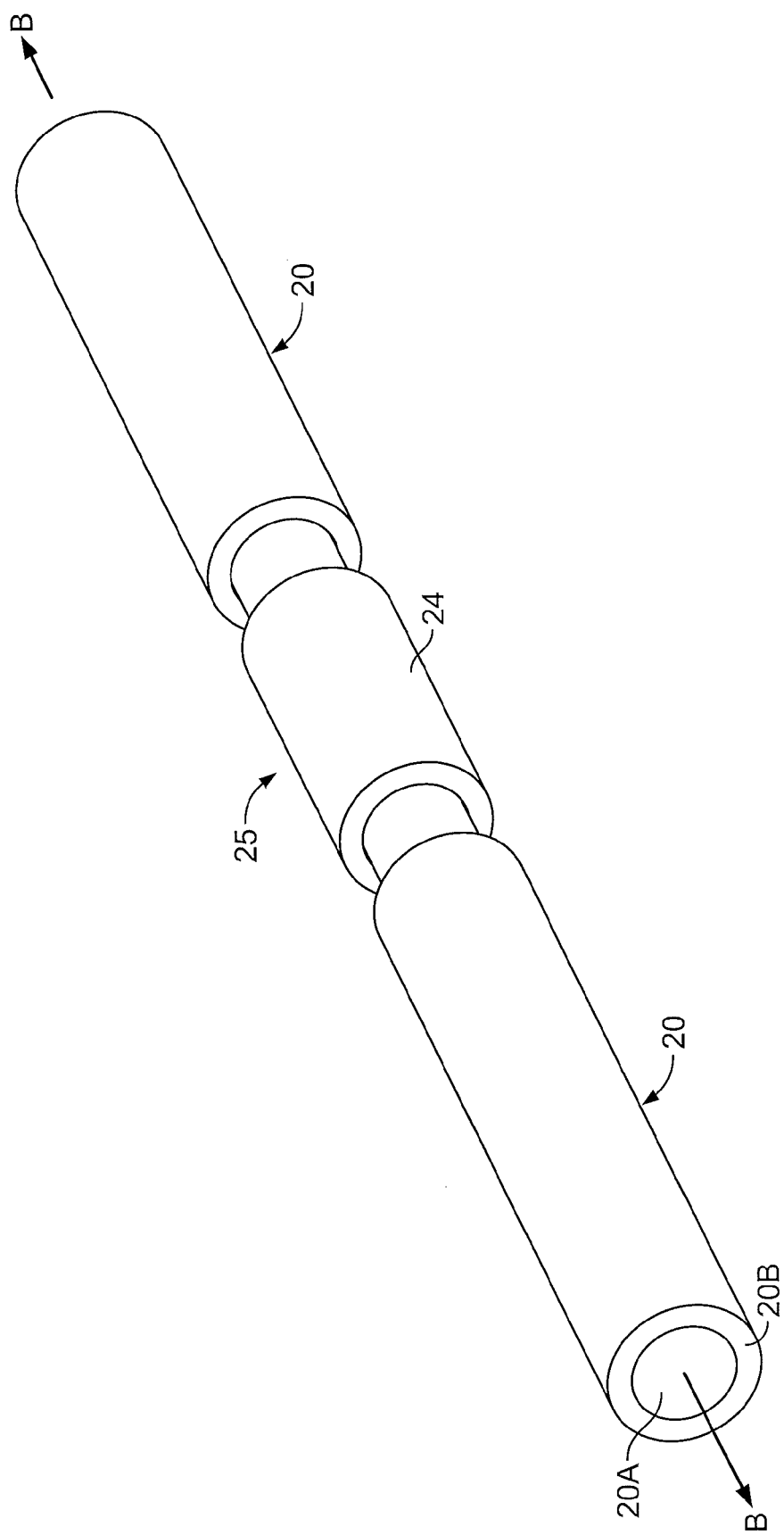
FIG. 6 is a perspective view of a pair of cables and a splice that may be covered using the sleeve assembly of FIG. 1.
Figure 7:
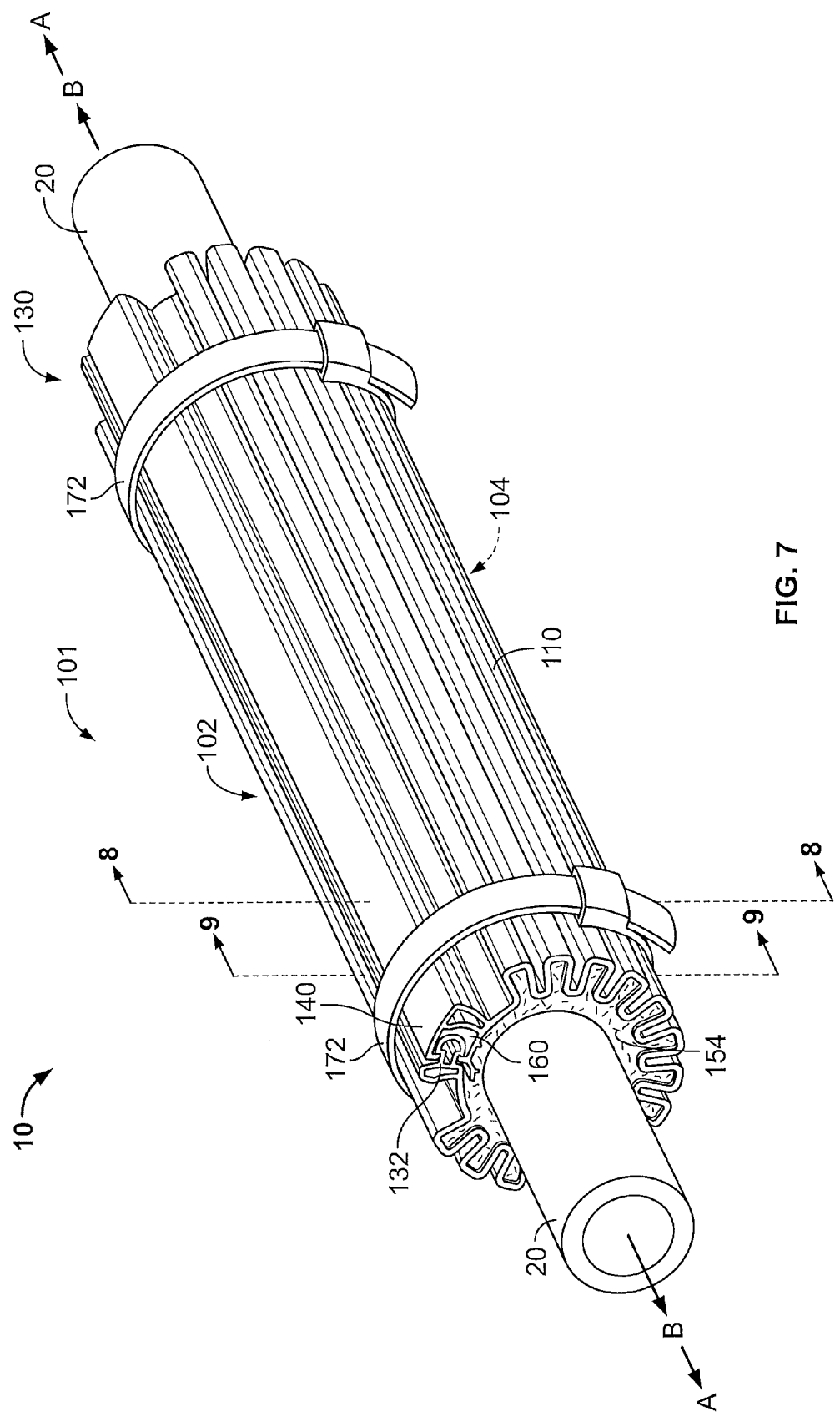
FIG. 7 is a perspective view of an environmentally protected connection assembly including a cover assembly formed from the sleeve assembly of FIG. 1.
Figure 8:
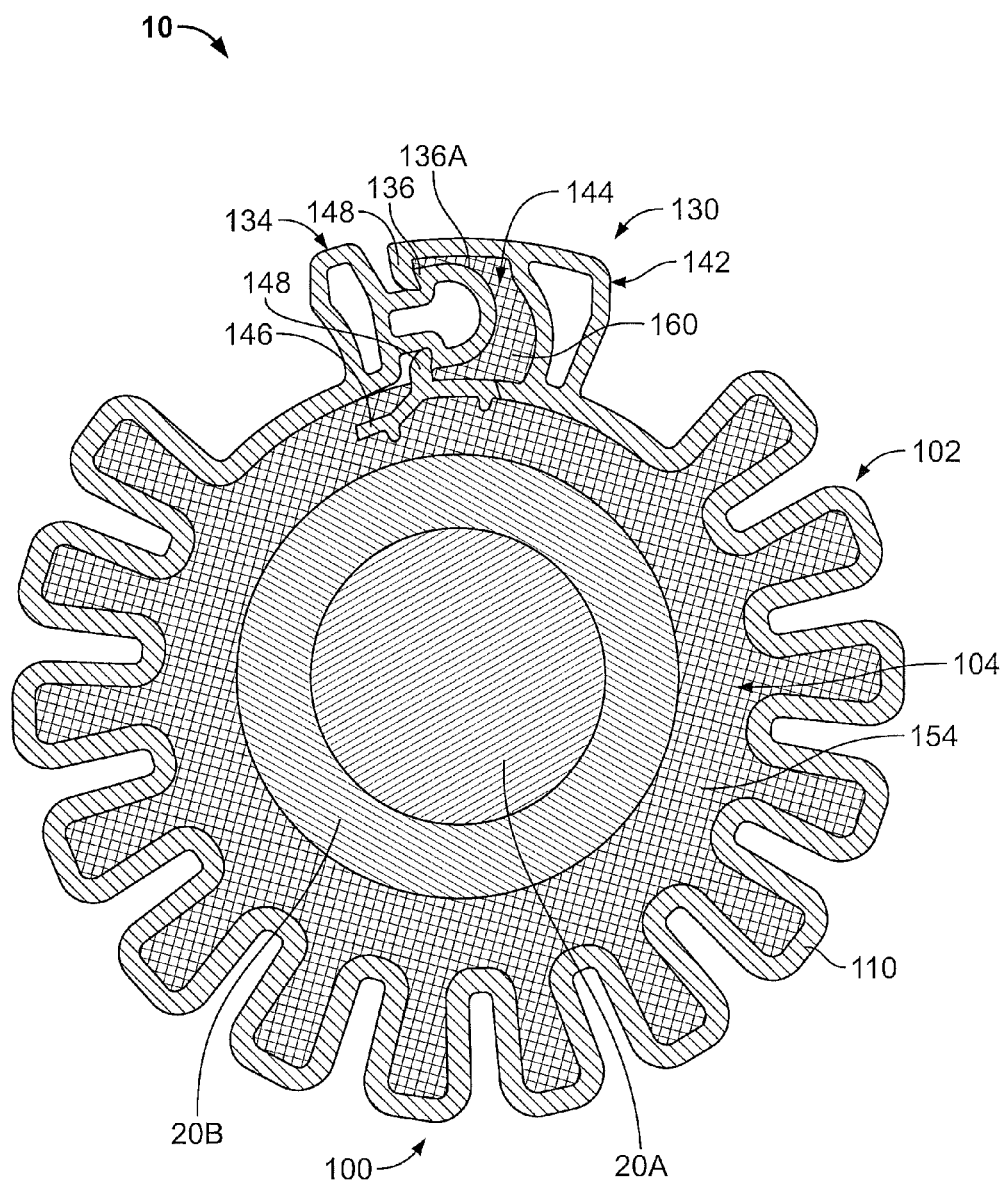
FIG. 8 is a cross-sectional view of the connection assembly of FIG. 7 taken along the line 8-8 of FIG. 7.
Figure 9:
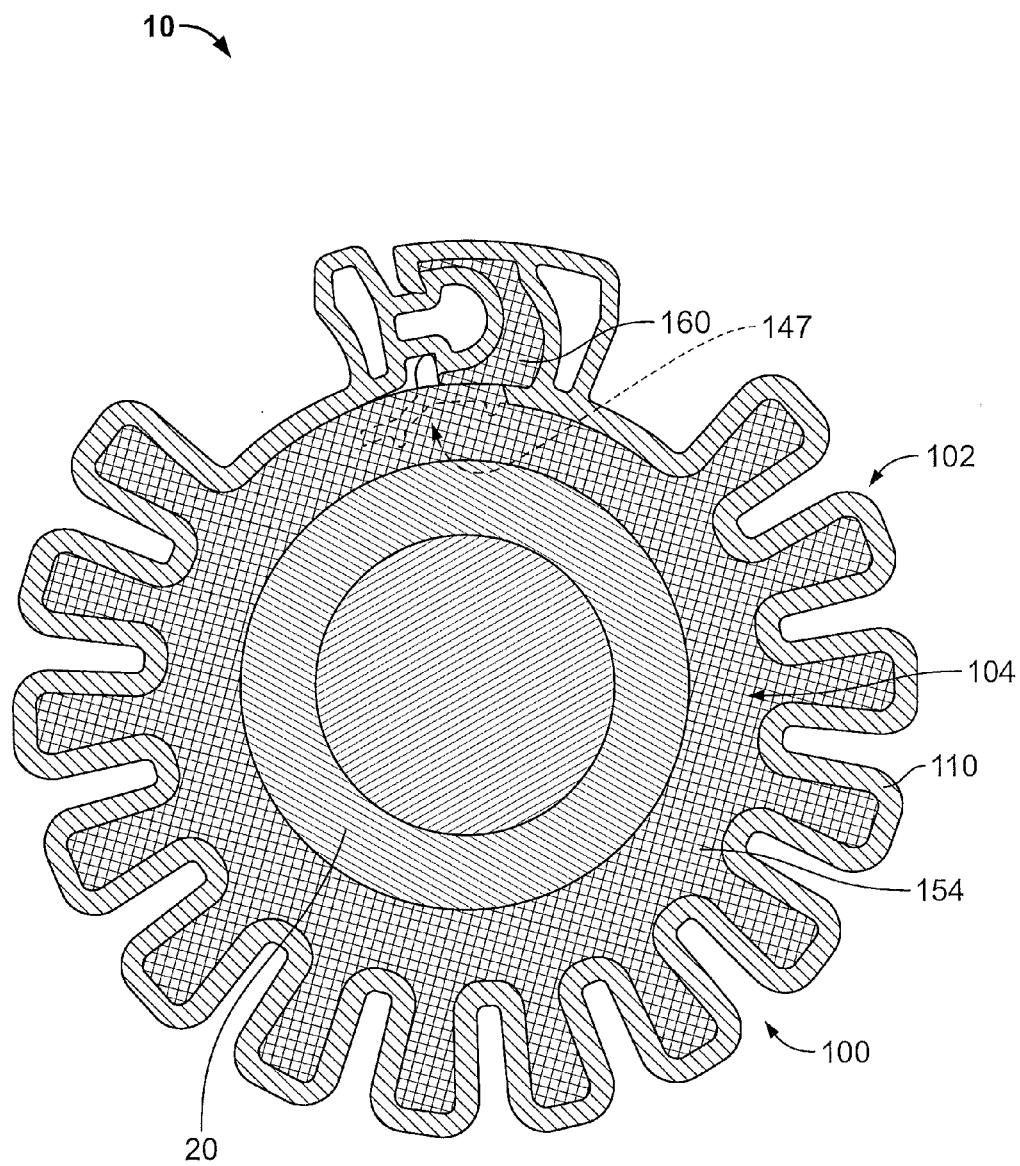
FIG. 9 is a cross-sectional view of the connection assembly of FIG. 7 taken along the line 9-9 of FIG. 7.

With reference to FIGS. 1-15, a cable rejacketing or covering system or kit 101 (FIG. 7) according to embodiments of the present invention is shown therein. The cable covering system 101 includes a sleeve assembly 100 (FIGS. 1-4) made from an electrically insulating material and, optionally, supplemental compression members or systems 172, 270, 380 or 480 as further discussed herein. The cable covering system 101 may be used to cover and electrically insulate electrical substrates such as cables and connectors. The covering kit 101 may be assembled into a cover assembly 102 (FIGS. 7-9) to cover and seal a connection or splice 25 (FIG. 6) between two or more cables 20 and a connector 24 to form an environmentally protected connection assembly 10 as shown in FIGS. 7-9, or to cover a damaged segment of a cable. Similarly, the covering kit may be used to rejacket a section of a cable where the jacket of the cable has been removed or compromised. The splice 25 or other suitable section(s) of the cable(s) may be contained in an environmentally sealed chamber 104 (FIGS. 7-9) defined within the cover assembly 102. The cables 20 may include an electrically conductive core 20A and a surrounding electrical insulation 20B (FIG. 6). The cables 20 have a cable axis B-B.

Referring to FIGS. 1-4, the sleeve assembly 100 includes a wrap-around sleeve 110, a pair of cable mastic masses, strips or patches 152, 154, and a closure mastic mass or strip 160.

Figure 3:
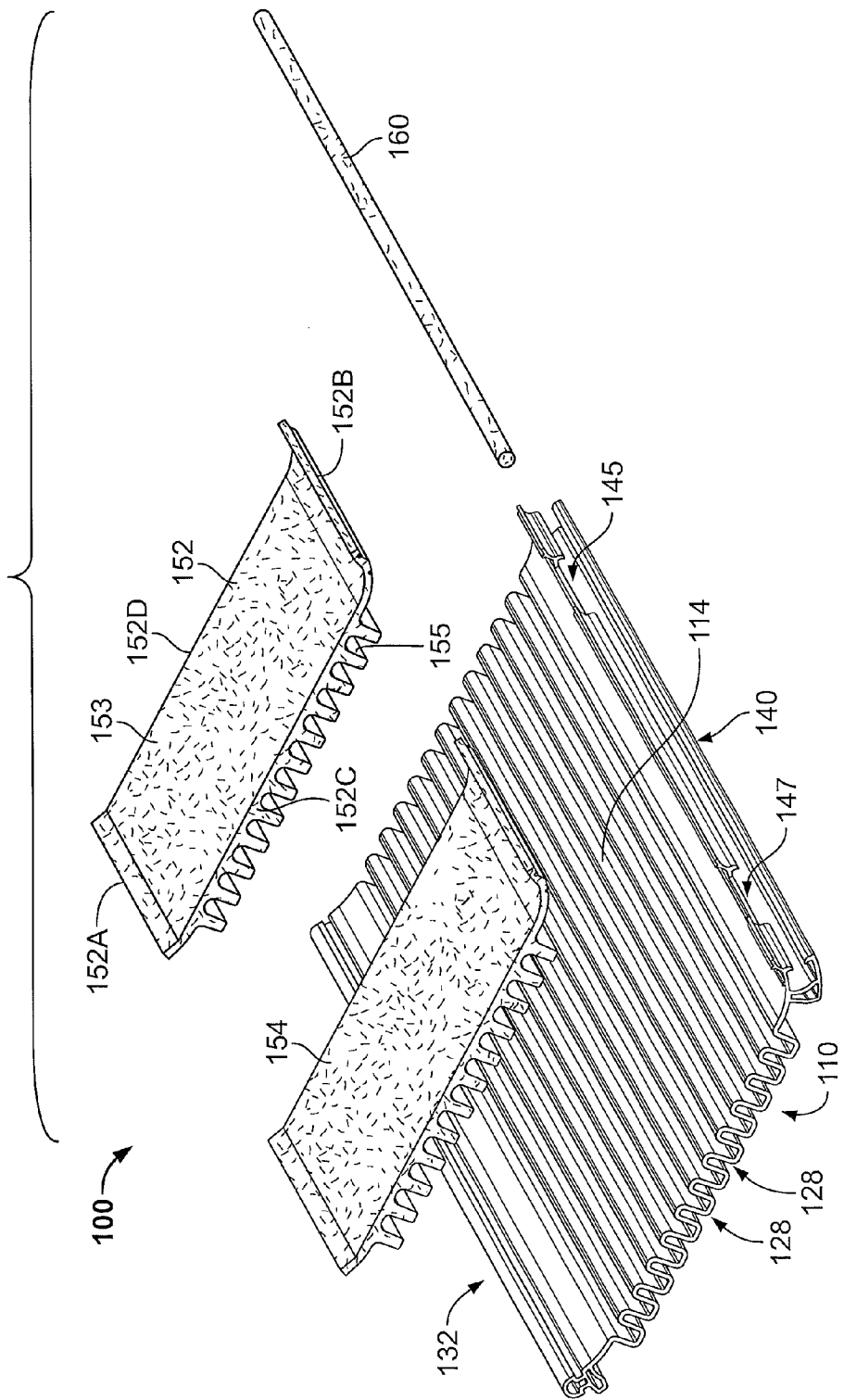
FIG. 3 is a top, rear, exploded perspective view of the sleeve assembly of FIG. 1.
Figure 4:
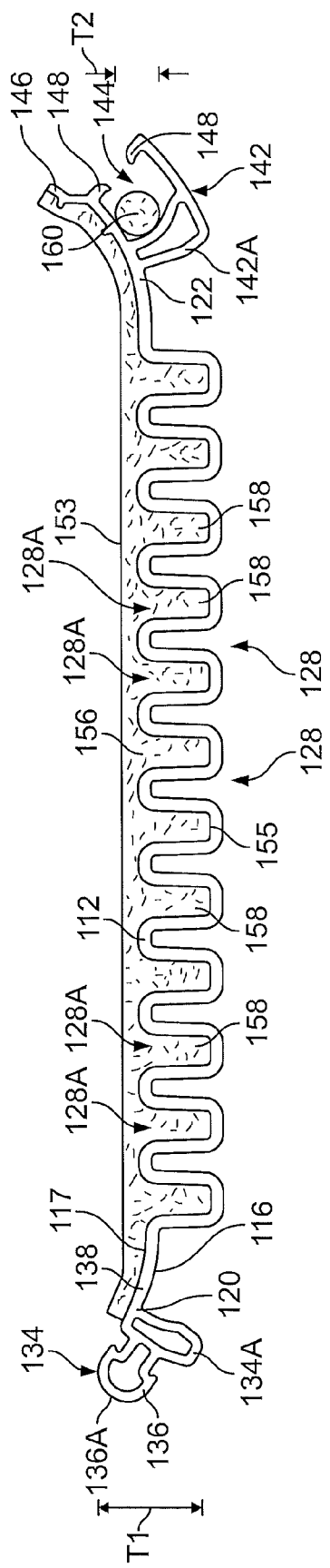
FIG. 4 is an end view of the sleeve assembly of FIG. 1.

The wrap-around cable sleeve 110 defines a lengthwise axis A-A (FIG. 1) and includes a longitudinally extending body 112 and a connector system 130 (FIG. 7). The longitudinally extending body 112 includes a longitudinally extending main portion 114 (FIG. 3). The longitudinally extending portion 114 has a first longitudinal closure edge 120, a second longitudinal closure edge 122 laterally spaced from and parallel to the first longitudinal edge 120, opposed laterally extending end edges 124, 126, an exterior side or surface 116 and an interior side or surface 117 (FIG. 4).

The main portion 114 has corrugations 128 undulating in lateral cross-section. As shown, the corrugations 128 are U-shaped in lateral cross-sectional profile; however, the corrugation profile may instead have a W-shaped zig-zag pattern or any other suitable pattern.

The connector system 130 (FIGS. 1, 4 and 8) includes a first connector portion 132 and a second connector portion 140 mateable therewith. The first connector portion 132 is configured as a pin or rib member 134 coupled to and extending from the first longitudinal edge portion 120. The rib member 134 has an insert member in the form of a pin or rib 136 with a leading edge 136A having a tapered profile (as shown, semi-circular). The rib member 134 has a tail member 138. The tail member 138 is coupled to the first longitudinal edge 120.

The second connector portion 140 is configured as a socket member 142 coupled to and extending from the second longitudinal edge 122. The socket member 142 defines a socket 144. The socket member 142 has a lip member 146 (FIG. 4) that extends from a closure side of the socket member 142 and has a distal end laterally spaced from the closure side. The socket 144 is configured to connectably engage with the rib 136. The socket 144 includes a pair of opposed seating or latching elements or barbs 148 (FIG. 4).

The rib member 134 and the socket member 142 may include grip surfaces 134A and 142A (FIG. 4), respectively, that may aid in wrapping and securing the sleeve 110 around a cable section.

A pair of longitudinally spaced apart cutouts or window openings 145, 147 are formed in the second connector portion 140. The window openings 145, 147 communicate with the socket 144 and are longitudinally registered or aligned with the mastic patches 152, 154.

The cable mastic patches 152, 154 are mounted on the sleeve 110 adjacent the end edges 124 and 126, respectively, and in longitudinally spaced apart relation to define a gap 151 (FIG. 1) therebetween. The cable mastic patches 152, 154 may be substantially identical in composition and configuration and, therefore, only the cable mastic patch 152 will be described in detail hereinbelow, it being understood that this description likewise applies to the cable mastic patch 154.

With reference to FIG. 3, the cable mastic patch 152 has opposed longitudinal edges 152A, 152B, opposed lateral edges 152C, 152D, an interior surface 153 and an opposing exterior surface 155 (facing the interior surface 116 of the sleeve 110). The cable mastic patch 152 extends continuously transversely across the sleeve 110 such that the longitudinal edges 152A and 152B are disposed at or beyond the longitudinal edges 120, 122 of the sleeve so that, when the sleeve 110 is wrapped and secured about a cable, lateral end portions of the cable mastic patch 152 overlap. The longitudinal edge 152A may be disposed further inboard from the longitudinal edge 120 than depicted in the drawings. The cable mastic patch 153 generally defines a body 156 and longitudinally extending ribs 158 depending therefrom. The interior surface 153 may be substantially planar.

The exterior surface 155 undulates with the profile of the ribs 158 and has a profile that substantially matches or is complementary to the interior surface 114 of the sleeve 110. That is, the ribs 158 fit into and conform to the channels 128A of the corrugations 128. According to some embodiments, the exterior surface 155 is adhered or bonded to the interior surface 114 at least throughout the corrugations 128 and, in some embodiments, throughout the lateral extent of the cable mastic patch 152.

As shown, the gap 151 is free of sealant on the main portion 114. However, according to other embodiments, additional cable mastic patches may be provided on the main portion 114 between the patches 152, 154 or the cable sealant may extend continuously from the location of the cable mastic patch 152 to the location of the cable mastic patch 154.

The closure mastic strip 160 is disposed in the socket 144, which thereby serves as a closure sealant chamber. More particularly, the closure mastic strip 160 extends lengthwise along the length of the socket 144 at least from the cable mastic patch 152 to the cable mastic patch 154. According to some embodiments, the closure mastic strip 160 extends continuously substantially from the edge 124 to the edge 126.

To provide a continuous seal for the cable chamber 104 of the wrap-around cable cover assembly 102 about the end openings and the closure seam of the sleeve 110, the cable mastic patch 152 and the cable mastic patch 154 each intersect the closure mastic strip 160 at the window openings 145, 147. More particularly, the cable mastic patch 152 sealingly contacts the closure mastic strip 160 through (at least partially) the first window opening 145 and the cable mastic patch 154 sealingly contacts the closure mastic strip 160 through (at least partially) the second window opening 147 (as shown in FIG. 9).

The wrap-around sleeve 110 is made from an electrically insulating material. This material may be a variety of electrically insulating materials as will be understood by those skilled in the art including, but not limited to, thermoplastics and thermoplastic elastomers. According to some embodiments, the electrically insulating material is a thermoplastic elastomer. The thermoplastic elastomer may be various thermoplastic elastomers as will be understood by those skilled in the art, and is preferably selected from the group consisting of polypropylene/rubber blends and polyurethanes. The most preferable thermoplastic elastomers are the polypropylene/rubber blends commercially available from Advanced Elastomer Systems of Akron, Ohio and sold under the Santoprene™ trademark. The longitudinally extending portion 114 may have a hardness as measured on the Shore A scale of at least about 55, preferably at least about 80, and more preferably at least about 90. The longitudinally extending portion 114 preferably has a flexural modulus between a lower limit and an upper limit The lower limit is preferably about 2,000 psi, more preferably about 4,000 psi, and most preferably about 6,000 psi. The upper limit is preferably about 100,000 psi, more preferably about 25,000 psi, and most preferably about 10,000 psi.

According to some embodiments, the longitudinally extending portion 114 has a 100% tensile modulus as measured using ASTM D412 between a lower limit and an upper limit. In some embodiments, the lower limit is about 250 psi, more preferably about 800 psi, and most preferably about 1300 psi. The upper limit is preferably about 3000 psi, more preferably about 1800 psi, and most preferably about 1600 psi. According to some embodiments, the longitudinally extending portion 114 has a tension set as measured using ASTM D412 of less than about 60 percent, more preferably less than about 50 percent, and most preferably less than about 20 percent. The longitudinally extending portion 114 may have a lateral range taking of at least about 15%, more preferably of at least about 30%, and most preferably of at least about 50%. The longitudinally extending portion 114 may have a longitudinal range taking of less than about 10%, more preferably less than about 5%, and most preferably less than about 2%.

According to some embodiments, the longitudinally extending portion 114 is made of first polymer, while the connector portions 132, 140 are made of a second, different (i.e., type and/or formulation) polymer. Thus, the connector portions 132, 140 may be provided a greater rigidity than the longitudinally extending portion 114. In some embodiments, the first polymer, forming the longitudinally extending portion 114, is a thermoplastic elastomer and the material of the connector portions 132, 140 having a greater rigidity is a polypropylene. Other connector arrangements could be employed. For example, a separate, external latching clasp may be applied to the longitudinal edges 120, 122 or cooperating features on the edges 120, 122.

The cable mastic patches 152, 154 may be formed of any suitable flowable sealing mastic. According to embodiments of the present invention, the cable mastic patches 152, 154 include a polymer that is at least partially crosslinked (semi-crosslinked). While cable mastic patches 152, 154 include a polymer that is at least partially crosslinked, the mastics 152, 154 are still deformable and adherent to the material of the sleeve 110 and the cable insulation 20B. However, the crosslinking in the cable mastic patches 152, 154 prevents them from flowing from the sleeve 110 at operating temperatures. According to some embodiments, the cable mastics 152, 154 are not free flowing at least in an operating temperature range of from −20 to 135° C. Thus, in some embodiments, the polymer in the cable mastic patches 152, 154 has a free flowing temperature that is higher than 140° C., more preferably higher than 150° C., and more preferably higher than 180° C. In some embodiments, the polymer of the cable mastic patches 152, 154 does not flow prior to decomposition due to crosslinking. In some embodiments, cable mastic patches 152, 154 include crosslinked butyl rubber. Other suitable mastics may include mastics including synthetic rubber or synthetic polymer mastics. Furthermore, according to some embodiments, the cable mastic patches 152, 154 are electrically insulative. Suitable polymers that may be included in the cable mastic patches 152, 154 include S 1278 sold by Tyco Electronics Corporation.

According to some embodiments, the thickness T1 (FIG. 4) of each cable mastic patch 152, 154 is in the range of from about 0.25 to 2 cm. According to some embodiments, the length L1 (FIG. 1) of each cable mastic patch 152, 154 is in the range of from about 5 to 15 cm. According to some embodiments, the width W1 (FIG. 1) of each cable mastic patch 152, 154 is in the range of from about 7 to 40 cm. The width W1 may be the same as the width of the sleeve body 112.

The closure mastic strip 160 may be formed of any suitable flowable sealing mastic. According to some embodiments, the closure mastic strip 160 is formed of a different mastic composition than the cable mastic patches 152, 154. According to some embodiments, the closure mastic strip 160 is a softer mastic than the cable mastic patches 152, 154 at an installation temperature in the range of from about −20 to 45 degrees Celsius. According to some embodiments, the mastic 160 is softer than the mastic 152, 154 at all temperatures in the operating temperature range. According to some embodiments, the mastic 160 has a lower free flowing temperature than the mastics 152, 154. According to some embodiments, the closure mastic strip 160 has a lower softening point temperature (i.e., a lower temperature range where the mastic will flow) than the cable mastic patches 152, 154.

In some embodiments, closure mastic strip 160 includes butyl rubber, and in some embodiments, closure mastic strip 160 includes synthetic rubber or synthetic polymer mastics. The mastic 160 may be semi-crosslinked. According to some embodiments, the mastic 160 is not free flowing at least in an operating temperature range of from −20 to 95° C. Furthermore, according to some embodiments, the closure mastic strip 160 is electrically insulative. Suitable polymers that may be included in the closure mastic strip 160 include S1337 type mastic sold by Tyco Electronics Corporation.

According to some embodiments, the thickness T2 (FIG. 4) of the closure mastic strip 160 is in the range of from about 0.25 to 1 cm. According to some embodiments, the length L2 (FIG. 1) of the closure mastic strip 160 is substantially the same as the length of the socket 144. According to some embodiments, the length L2 is at least the distance from the cable mastic patch 152 to the cable mastic patch 154.

The wrap-around sleeve 110 may be formed using any suitable technique. In some embodiments, a web of electrically insulating material is extruded and then cut to form a wrap-around cable sleeve having a first end and a second end. The extruding step may include extruding a web that includes corrugations defining a corrugated lateral cross-section. The extruding step may also include coextruding a rigid thermoplastic and a thermoplastic elastomer. The extruding step may be performed by any suitable method as will be understood by those skilled in the art. The cable mastic patches 152, 154 and the closure mastic strip 160 may be mounted on or applied to the sleeve 110 (as described below, for example) before or after the web is cut to the selected length.

According to some embodiments, the cable mastic patches 152, 154 are hot pressed or heated prior to being pressed onto the sleeve 110. In particular, in some embodiments as discussed above the cable mastic patches 152, 154 are semi-crosslinked mastics and, as such, have limited flowability or deformability at room temperature. In order to ensure a good interface and adhesion with the interior surface 116 in the corrugation channels 128A, each cable mastic patch 152, 154 is heated to a prescribed elevated temperature and pressed at a prescribed pressure for at least a prescribed period of time such that the cable mastic patch 152, 154 flows or deforms and conforms to the corrugation channels 128A. The cable mastic patch 152, 154 is thereafter permitted to cool to room temperature. According to some embodiments, the prescribed elevated press temperature is in the range of from about 60 to 100 degrees Celsius and, in some embodiments, from about 80 to 120 degrees Celsius. According to some embodiments, the prescribed press pressure is in the range of from about 150 to 350 kPa and, in some embodiments, from about 250 to 750 kPa. According to some embodiments, the prescribed press time is in the range of from about 0.5 to 2 seconds and, in some embodiments, from about 0.25 to 5 seconds.

Figure 5:
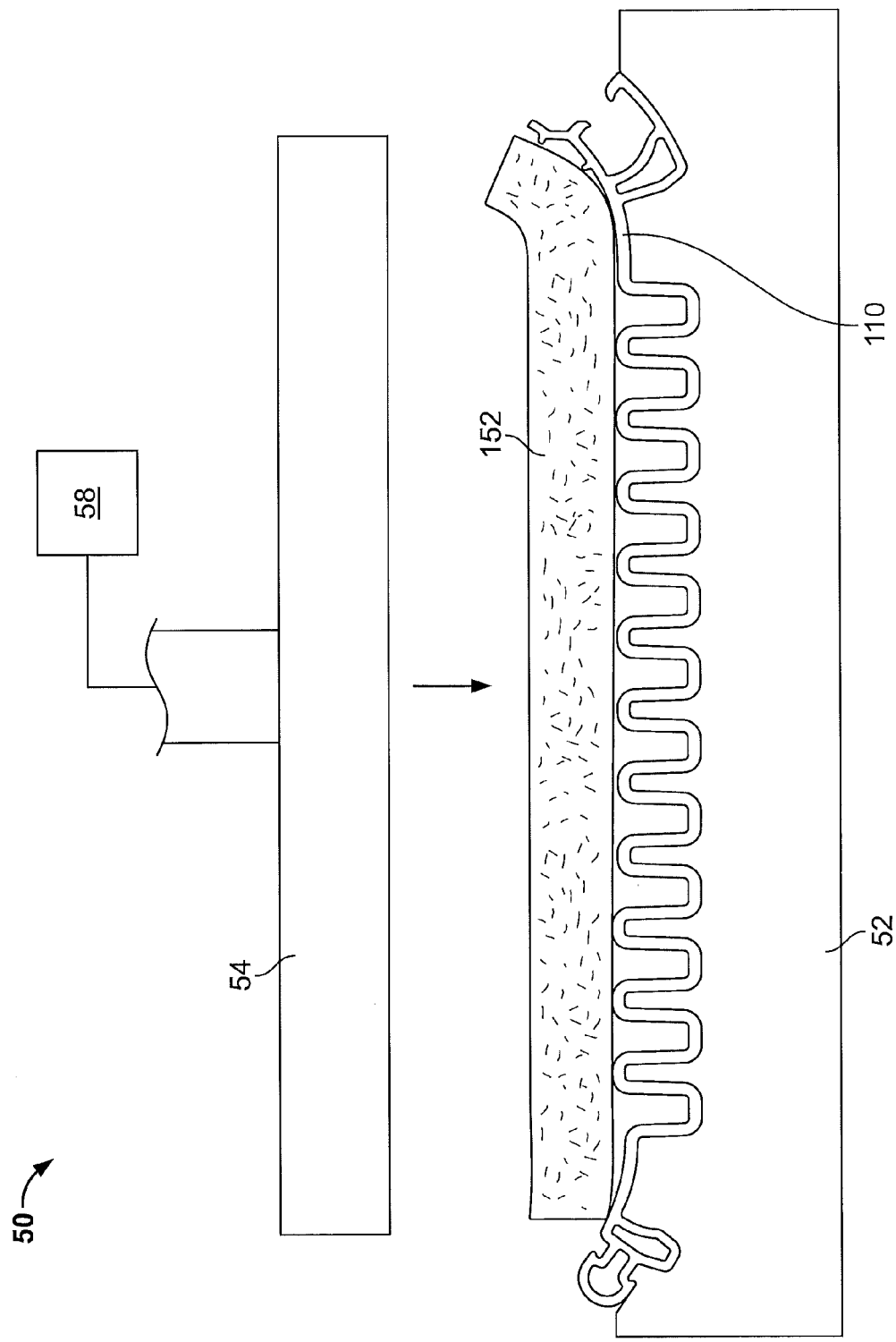
FIG. 5 is an end view of a press apparatus for forming the sleeve assembly of FIG. 1.

With reference to FIG. 5, an exemplary press apparatus 50 according to embodiments of the present invention for pressing the cable mastic patch 152 into the sleeve 110 is shown therein. The press apparatus 50 includes a platen 52 to hold the sleeve 110. The press apparatus 50 further includes a press head 54 to apply a load to the pre-heated cable mastic patch 152. Optionally, a heating device (e.g., an electrical resistance heater) may be operably connected to the platen 52 and the press head 54 to heat each. A loading device or actuator 58 (e.g., a hydraulic cylinder) is operably connected to the press head 54 to apply a load thereto. Alternatively, the press head 54 may be manually actuated. In some embodiments, the mastic patch 152 is preheated to the prescribed elevated temperature, placed on the sleeve 110, and then placed on the platen 52 and pressed.

The closure mastic strip 160 may be installed in the socket 144 by any suitable technique. According to some embodiments, the sealant strip 160 is preformed (e.g., by extrusion) as a bead or rope and dropped or inserted axially into the socket 144. Alternatively, the sealant strip 160 may be extruded axially or transversely into the socket 144 (e.g., dispensed into the socket 144 like a hot melt adhesive).

Referring now to FIGS. 6-9, the covering kit 101 may be used in the following manner to apply the sleeve assembly 100 over a splice connection 25 (FIG. 6) between a pair of electrical power transmission cables 20 to form an environmentally protected connection assembly 10 (FIGS. 7-9).

According to some embodiments, the cables 20 are low-voltage or medium-voltage (e.g., between about 120 Volts and 46 kV) power transmission cables.

Figure 1:
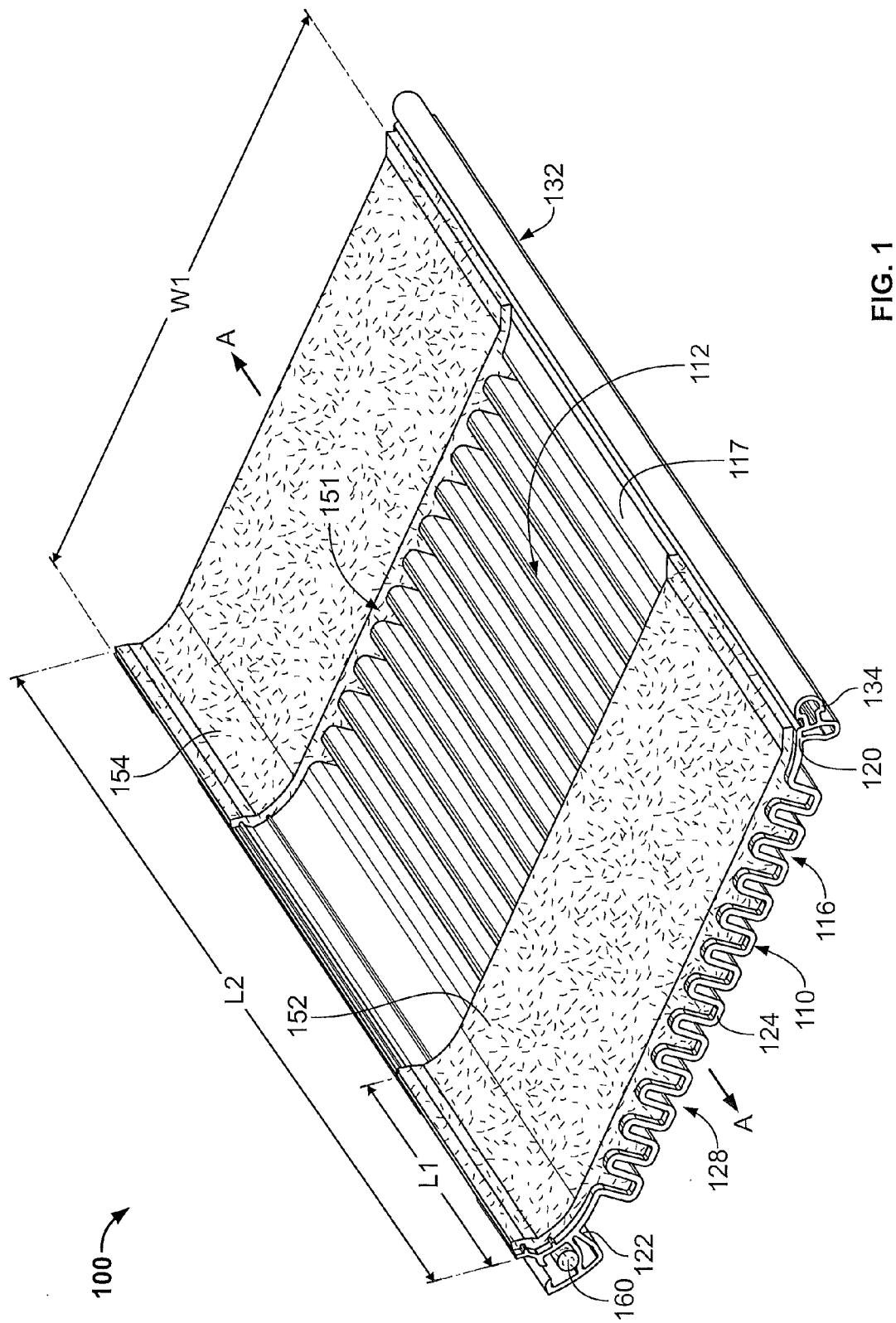
FIG. 1 is a top, front perspective view of a wrap-around sleeve assembly according to embodiments of the present invention.
Figure 2:
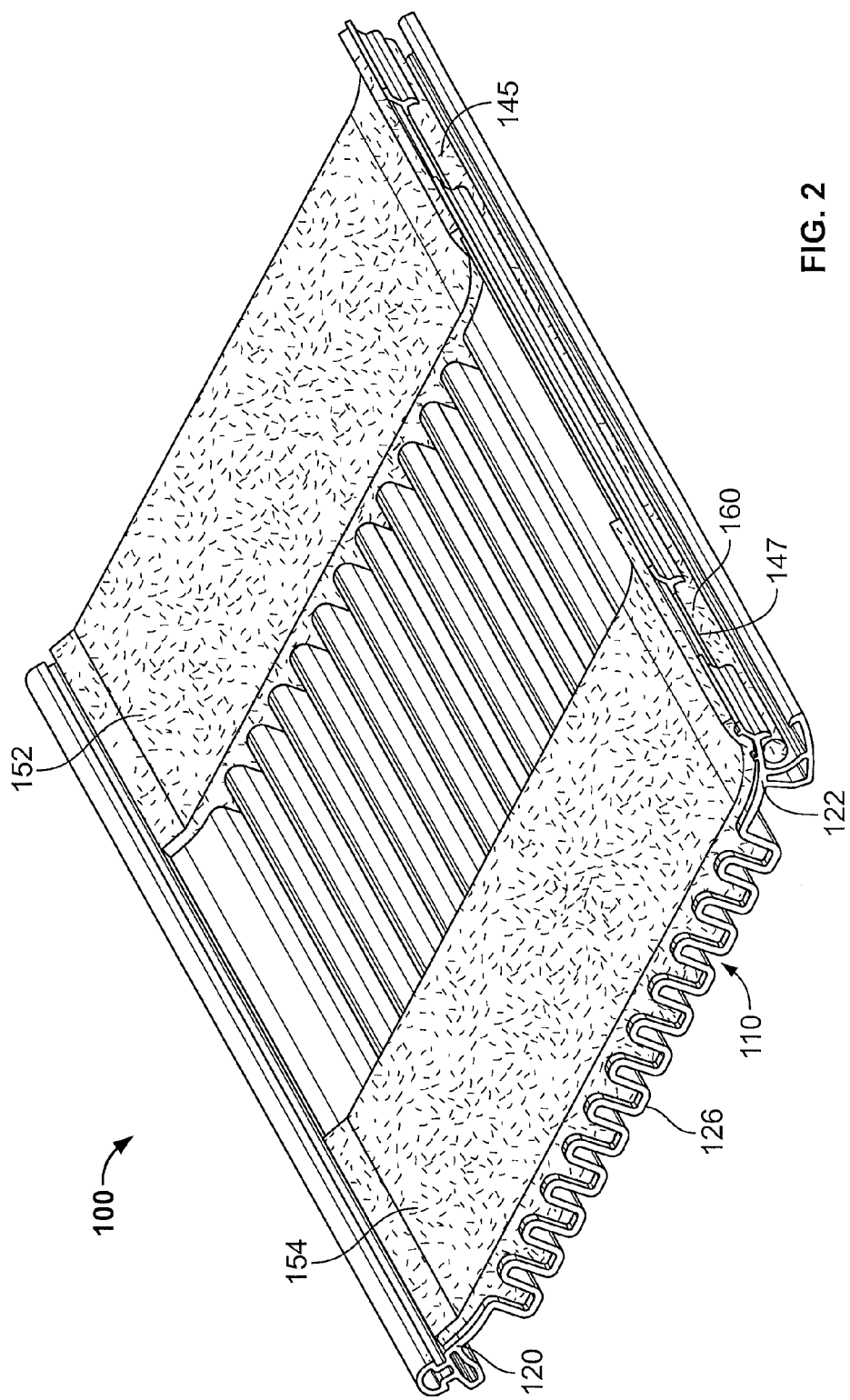
FIG. 2 is a top, rear perspective view of the sleeve assembly of FIG. 1.

With the sleeve assembly 100 in an open position as shown in FIG. 1, the sleeve assembly 100 is positioned adjacent the cables 20 at the axially location where the cover assembly 102 is to be installed. The sleeve 110 is then wrapped circumferentially about the cables 20 (i.e., about the sleeve axis A-A and the cable axis B-B) to bring the connector portions 132, 140 into engagement. More particularly, the rib 136 is inserted into the socket 144 and captured therein by the barbs 148. In this manner, the sleeve 110 is latched closed to form a continuous tubular member from end to end and defining the cable chamber 104. According to some embodiments, the sleeve 110 is sized such that its relaxed inner diameter when closed is less than the outer diameter of the cables 20 so that the sleeve 110 will fit closely against the cables and the corrugations 128 will be at least somewhat distended. However, in some embodiments, the relaxed inner diameter when closed is greater than the outer diameter of the cables 20 so that an external or supplemental compression member is required to tighten the sleeve 110 onto the cables 20.

The connector members 132, 140 can be brought into latching engagement using any suitable technique. According to some embodiments, temporary pre-latch clips are applied to the connector members 132, 140 to hold them together while the installer interlocks the connector portions 132, 140. A tool may be used to provide mechanical advantage and make or assist in making the engagement. For example, the installer may use a tool as described in U.S. Pat. No. 7,197,816 to Frye, U.S. Pat. No. 6,094,792 to Frye, U.S. Pat. No. 6,195,861 to Frye, or U.S. Pat. No. 6,219,907 to Frye, the disclosures of which are incorporated herein by reference.

As the rib 136 enters the socket 144, the lead surface 136A displaces the closure mastic strip 160, which flows about and between the connector portions 132, 140 to form an axial seal along the full length of the sleeve 110 between the openings 145 and 147.

As the sleeve 110 is forced into closure about the cables 20, the cable mastic patches 152, 154 are forced radially inwardly into engagement with the cables 20 so that the cable mastic patches 152, 154 fully circumferentially surround the cables 20 and each form a circumferential environmental seal about the respective cable 20. The environmental seal provided by the closure mastic strip 160 and the environmental seals provided by the cable mastic patches 152, 154 combine to environmentally seal the cable chamber 104. The continuity of the overall seal may be ensured by the merger of the mastics 152, 154, 160 at the window openings 145, 147. This seal can protect the cables 20 and the splice 25 from the ingress of environmental moisture, for example.

The cable mastic patches 152, 154 exhibit a limited degree of cold flow (i.e., deformation under mechanical load in a prescribed normal service or operating temperature range) that permits the cable mastic patches 152, 154 to conform to the cables 20 upon closure of the sleeve 110 and, if provided, upon loading by supplemental compression members. However, within the normal service temperature range, the free flow ability of the cable mastic patches 152, 154 remains low enough to prevent the cable mastic 152, 154 from excessive flowing, creeping or being undesirably displaced from the sealing zone by gravity, environmental water pressure, cable movement or the like. Moreover, according to some embodiments (and, in particular, in embodiments wherein the cable mastic patches 152, 154 are formed of a semi-crosslinked mastic), the free flow ability of the cable mastic patches 152, 154 will also remain sufficiently low at anticipated or possible in-service elevated temperatures to prevent such undesirable displacement from the sealing zone. These elevated temperatures may be experienced due to extremes in cable resistance heating or the like.

According to some embodiments, supplemental compression members are mounted on the cover assembly 102 to resist displacement of the sleeve 110 along the cables 20, limit radial and axial expansion of the sleeve 110, and/or to radially inwardly compress the sleeve 110 into sealing contact with the cable mastic patches 152, 154 and the cable mastic patches 152, 154 into sealing contact with the cables 20. In accordance with some embodiments, the compression members are cable ties, zip ties or tie wraps 172. Other suitable compression members may include spring hose clamps, rope, strap clamps, worm drive hose clamps, or snap hose clamps.

Figure 10:
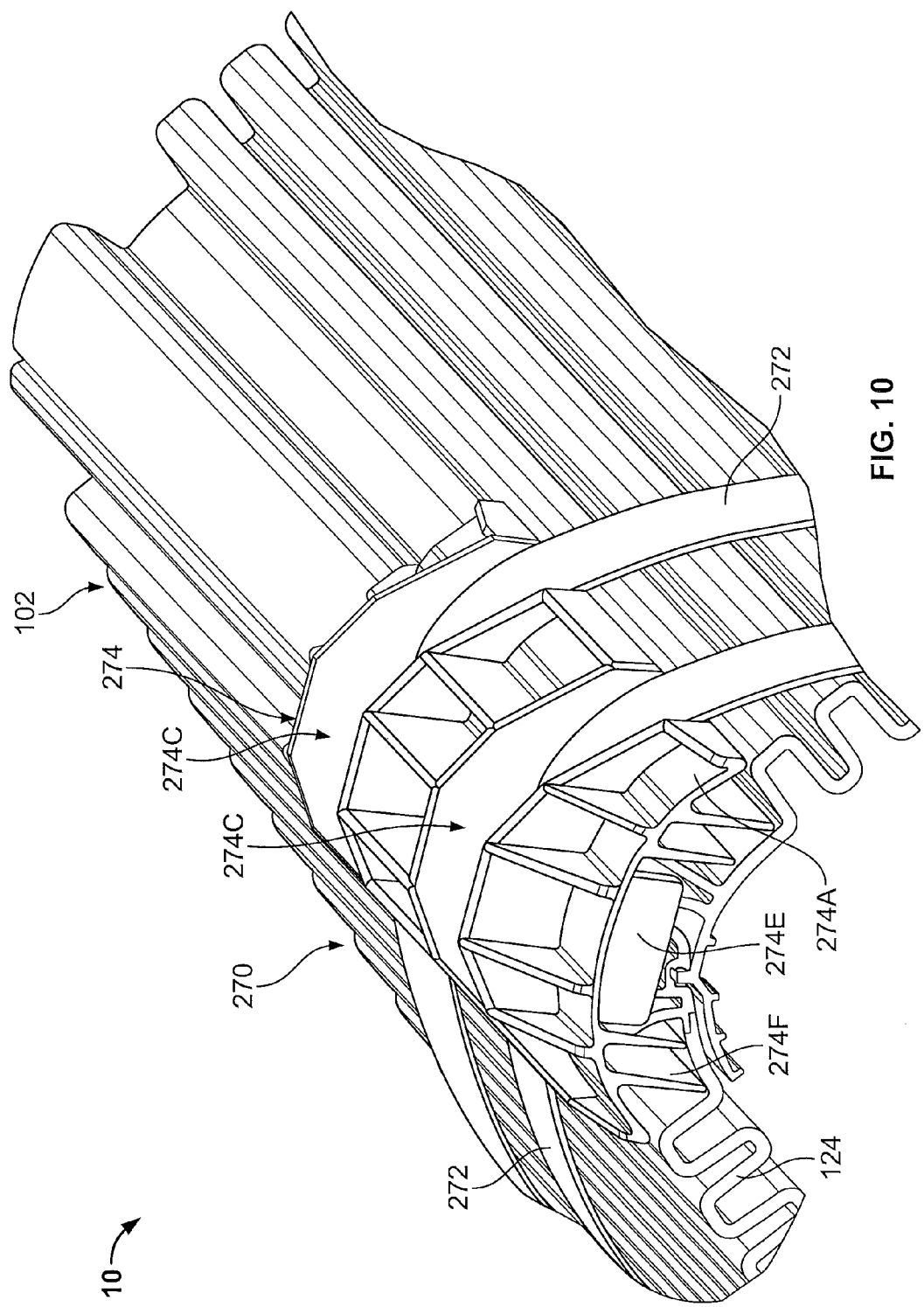
FIG. 10 is a fragmentary, perspective view of the cover assembly of FIG. 7 with an alternative compression system according to embodiments of the present invention.
Figure 11:
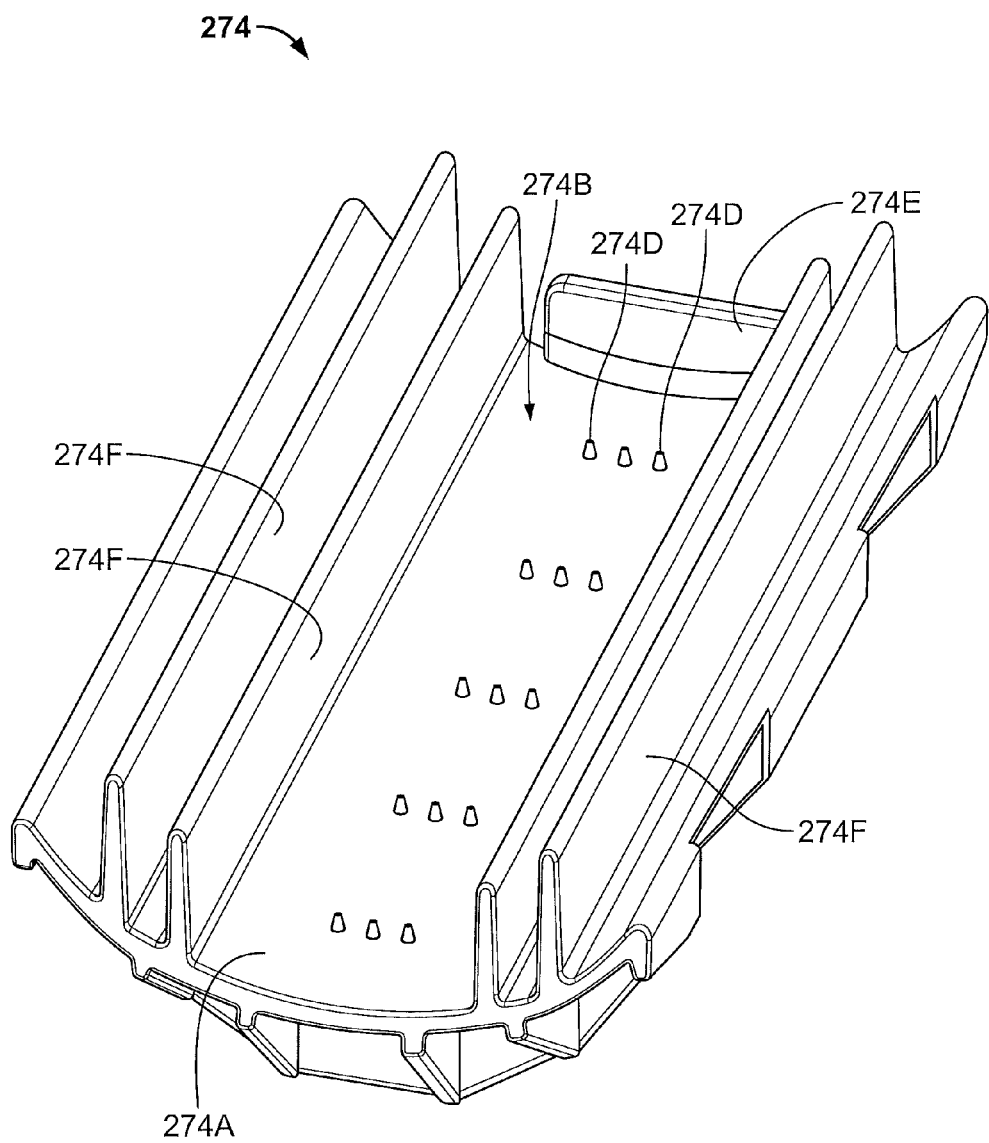
FIG. 11 is a bottom perspective view of an anchor member forming a part of the compression system of FIG. 10.

According to some embodiments and with reference to FIGS. 10 and 11, a compression system 270 is provided on the cover assembly 102. The compression system 270 includes two pairs of tie wraps 272 and a pair of anchor members 274. Each anchor member 274 has a body 274A with a locator tab 274E and defines a sleeve seat 274B and tie seats 274C. Integral pins 274D extend from the body 274A into the sleeve seat 274B and locator ribs 274F also depend from the body 274A. According to some embodiments, the anchor members 274 are formed of a rigid polymeric material such as filled polypropylene or polycarbonate. The anchor members 274 may be molded.

In use, an anchor member 274 is mounted on each end of the sleeve 110 over a corresponding layer of cable mastic patch 152, 154 and such that the locator tab 274E thereof abuts the adjacent end edge 124, 126. The tie wraps 272 are routed through the tie seats 274C and cinched tight about the anchor member 274 and the sleeve 110 to compress the cable mastic patch 152 or 154 as discussed above.

The compressive load on the anchor member 274 causes the pins 274D to embed in the outer surface of the sleeve 110. In this way, the anchor members 276 are axially and circumferentially secured with the respect to the sleeve 110 and the axial positions of the tie wraps 272 along the sleeve 110 are thereby secured as well. The anchor members 274 can help to ensure that the tie wraps 272 maintain their positions about the cable mastic patches 152, 154. The anchor members 274 may also more widely and uniformly distribute the loads of the tie wraps 272 to reduce unintended deformation of the sleeve 110. The locator tabs 274E serve to properly register the anchor members 274 with respect to the cable mastic patches 152, 154 and may also resist skewing of the anchor members 274.

While tie wraps 272 are shown in FIG. 10 and described above, other types of compression members (e.g., clamps) may be used in place of the tie wraps 272.

Figure 12:
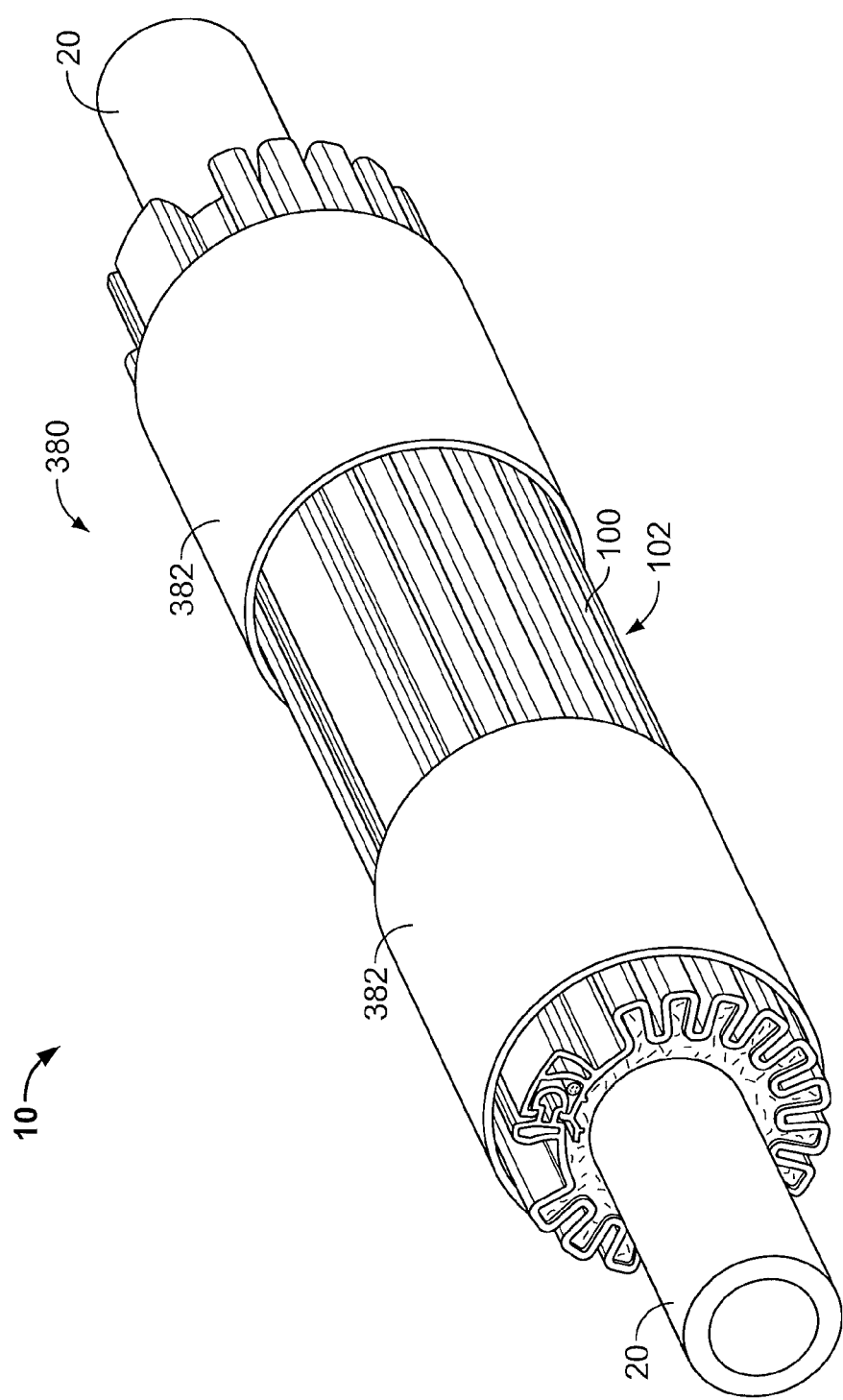
FIG. 12 is a perspective view of the cover assembly of FIG. 7 with an alternative compression system according to embodiments of the present invention.
Figure 13:
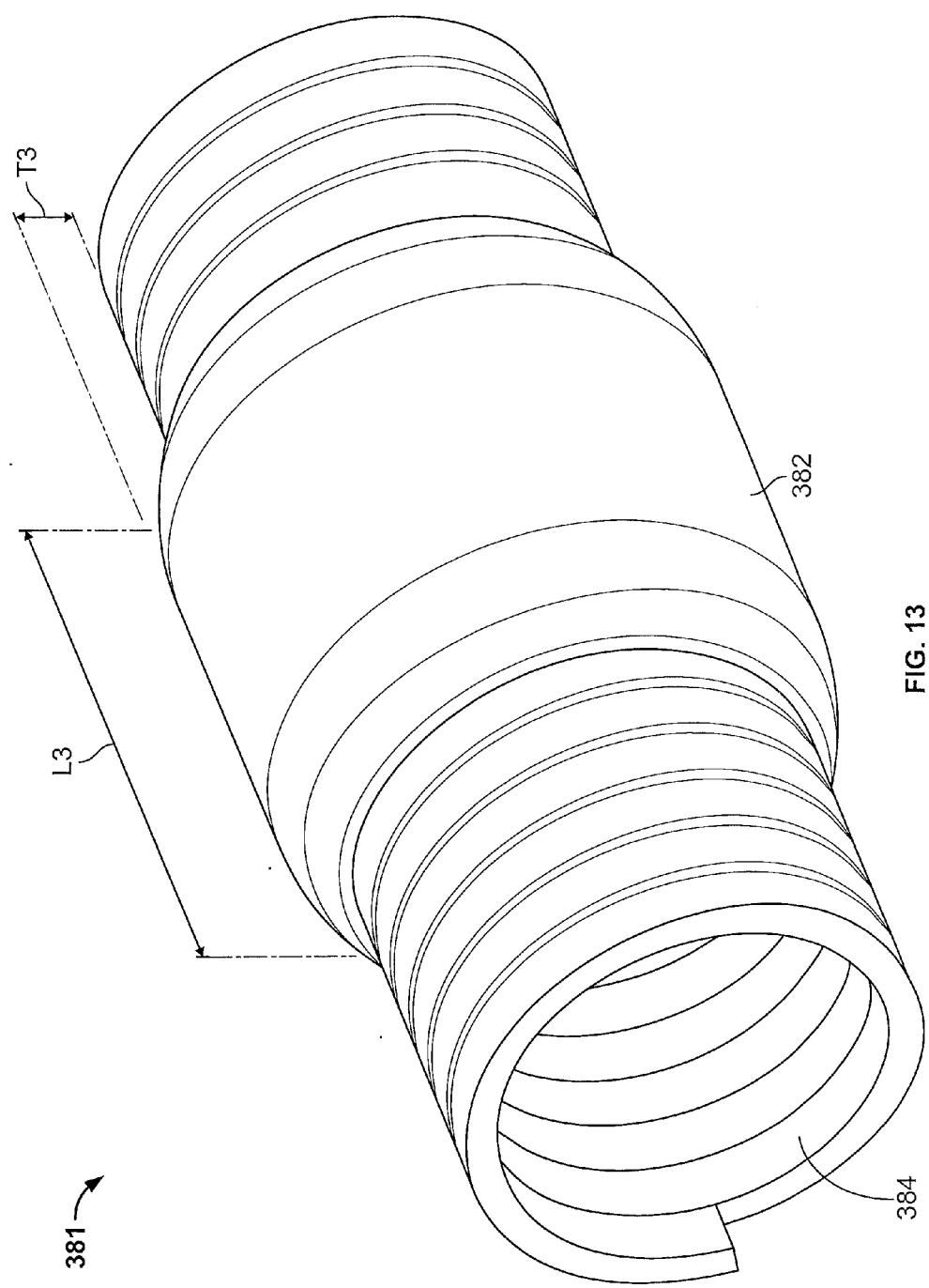
FIG. 13 is a perspective view of a pre-expanded unit that may be used to deploy the compression system of FIG. 12.

With reference to FIG. 12, a compression system 380 according to further embodiments of the present invention is shown therein partially installed on the cover assembly 102. The compression system 380 includes a pair of cold-shrinkable compression sleeves or band 382. The compression bands 382 may each be supplied as a pre-expanded unit 381 on a holdout 384 (as shown in FIG. 13), wherein the compression bands 382 is in an elastically expanded state or position.

The compression bands 382 can be formed of any suitable material. According to some embodiments, the compression bands 382 are formed of an electrically insulative material. According to some embodiments, the compression bands 382 are formed of an elastically expandable material. According to some embodiments, the compression bands 382 are formed of an elastomeric material. According to some embodiments, the compression bands 382 are formed of ethylene propylene diene monomer (EPDM) rubber. Other suitable materials may include neoprene or other rubber. According to some embodiments, the compression bands 382 have a Modulus at 100 percent elongation (M100) in the range of from about 0.1 to 10 MPa. According to some embodiments, the compression bands 382 are endless bands.

According to some embodiments, the thickness T3 (FIG. 13) of each compression band 382 is in the range of from about 0.1 to 0.5 cm. According to some embodiments, the length L3 of each compression band 382 is in the range of from about 5 to 15 cm. According to some embodiments, the length L3 of each compression band 382 is between about 25 and 125 percent of the length L3 of the corresponding cable mastic patch 152, 154.

The holdout 384 can be formed of any suitable material. According to some embodiments, the holdout 384 is formed of a rigid cardboard or plastic. According to some embodiments, the holdout 384 includes a strip helically wound to form a rigid cylinder as illustrated, for example. The holdout 384 device 384 may be factory installed. In some embodiments, the compression bands 382 may instead be pre-expanded in the field using a suitable expansion tool.

During installation, the pre-expanded units 381 are slid over each cable 20 before the connection 25 is made, for example. According to some embodiments, the inside diameter of the holdout 384 is greater than the outer diameter of the sleeve assembly 100 such that the inner diameter of the holdout 384 is sufficient to receive the sleeve assembly 100 without undue effort. The pre-expanded units 381 may be retained or parked on the cables 20 until the operator is ready to install the compression bands 382 on the cable sleeve assembly 100.

After the sleeve assembly 100 has been installed as discussed above to form the protective cover assembly 102, each pre-expanded unit 384 is slid into position over the sleeve 110 and, more particularly, over a respective one of the cable mastic patches 152, 154. The holdout 384 is then removed from the compression band 382, thereby permitting the compression band 382 to relax and forcibly radially retract about the sleeve 110. According to some embodiments, the compression bands 382 are fully disposed between the end edges 124, 126 of the sleeve 110 and do not hang off of the sleeve 110 or directly engage the cables 20.

The relaxed inner diameter of the compression bands 382 is less than at least the outer diameter of the installed sleeve assembly 100. Therefore, the compression bands 382 exert a radially inwardly compressive or clamping force, load or pressure (due to elastic tension) onto the sleeve 110 and the cable mastic patches 152, 154. The compression bands 382 thereby improve and/or maintain the seal at the interface between the cables 20 and the cable mastic patches 152, 154 and the seal at the interface between the cable mastic patches 152, 154 and the interior surface 116 of the sleeve 110. In this manner, the engagement and thereby the seals between each cable mastic patch 152, 154 and the cables 20 and the sleeve 110 are maintained and reinforced.

According to some embodiments, the compression bands 382 remain elastic and apply a persistent radially compressive load on the underlying components after installation. That is, the compression bands 382 continue to apply a radially inward bias. This persistent bias may help to maintain the seal between the cable mastic patches 152, 154 and the cable 20 and the sleeve 110 even when these components expand and contract (e.g., as a result of temperature changes therein) or are mechanically displaced with respect to one another. The compression bands 382 thus serve as pre-loaded pressure applying or biasing bands after installation. According to some embodiments, the compression bands 382 each apply a persistent radially compressive load in the range of from about 35 to 250 kPa.

According to some embodiments, the relaxed inner diameter of each compression band 382 is at least 10% less than the smallest diameter installed cover assembly 102 onto which the compression band 382 is intended to be installed.

Although a helically wound holdout 384 is shown and described above, other types of holdouts and methods of deployment may be used. For example, the holdout may be a tube from which the compression band 382 is rolled onto the sleeve 110.

Figure 14:
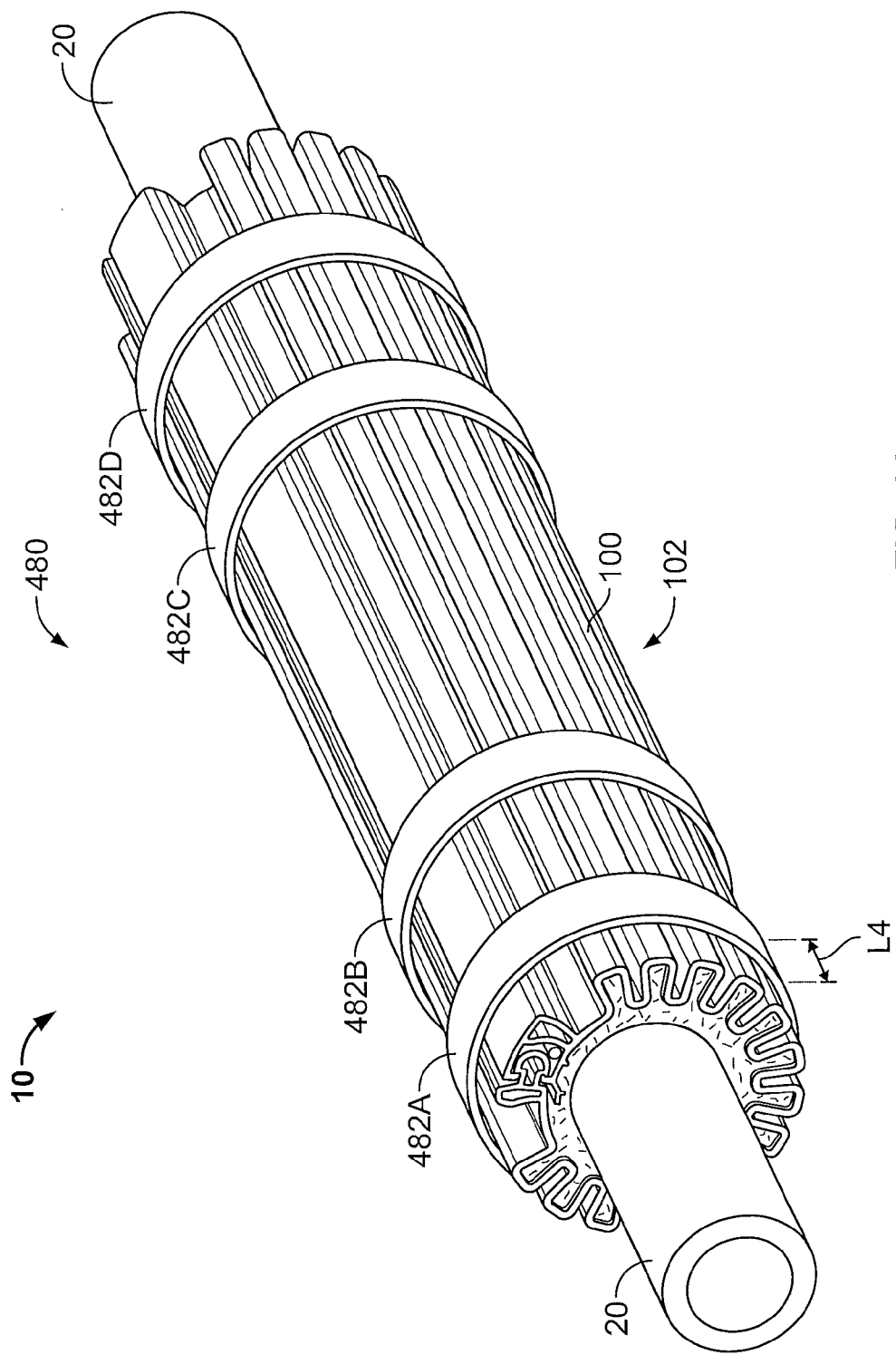
FIG. 14 is a perspective view of the cover assembly of FIG. 7 with an alternative compression system according to embodiments of the present invention.

With reference to FIG. 14, a compression system 480 according to further embodiments of the present invention is shown therein partially installed on the cover assembly 102. The compression system 480 corresponds to the compression system 380 except that a set of multiple cold shrinkable compression bands 482A-D are provided and installed on each end of the sleeve assembly 100. The compression bands 482A-D of each set may be provided on a shared holdout 484 as shown or may each be mounted on their own individual holdout.

The compression bands 482A-D may be formed of the same materials and installed in the same manner as discussed above with regard to the compression bands 382. The compression bands 482A, 482B and 482C, 482D of a given set may have the same or different properties from one another (e.g., elastic modulus, relaxed diameter, width, thickness, and/or material).

According to some embodiments, the thickness of each compression band 482A-D is in the range of from about 0.1 to 0.5 cm. According to some embodiments, the length L4 of each compression band 482A-D is in the range of from about 0.25 to 3 cm.

Figure 15:
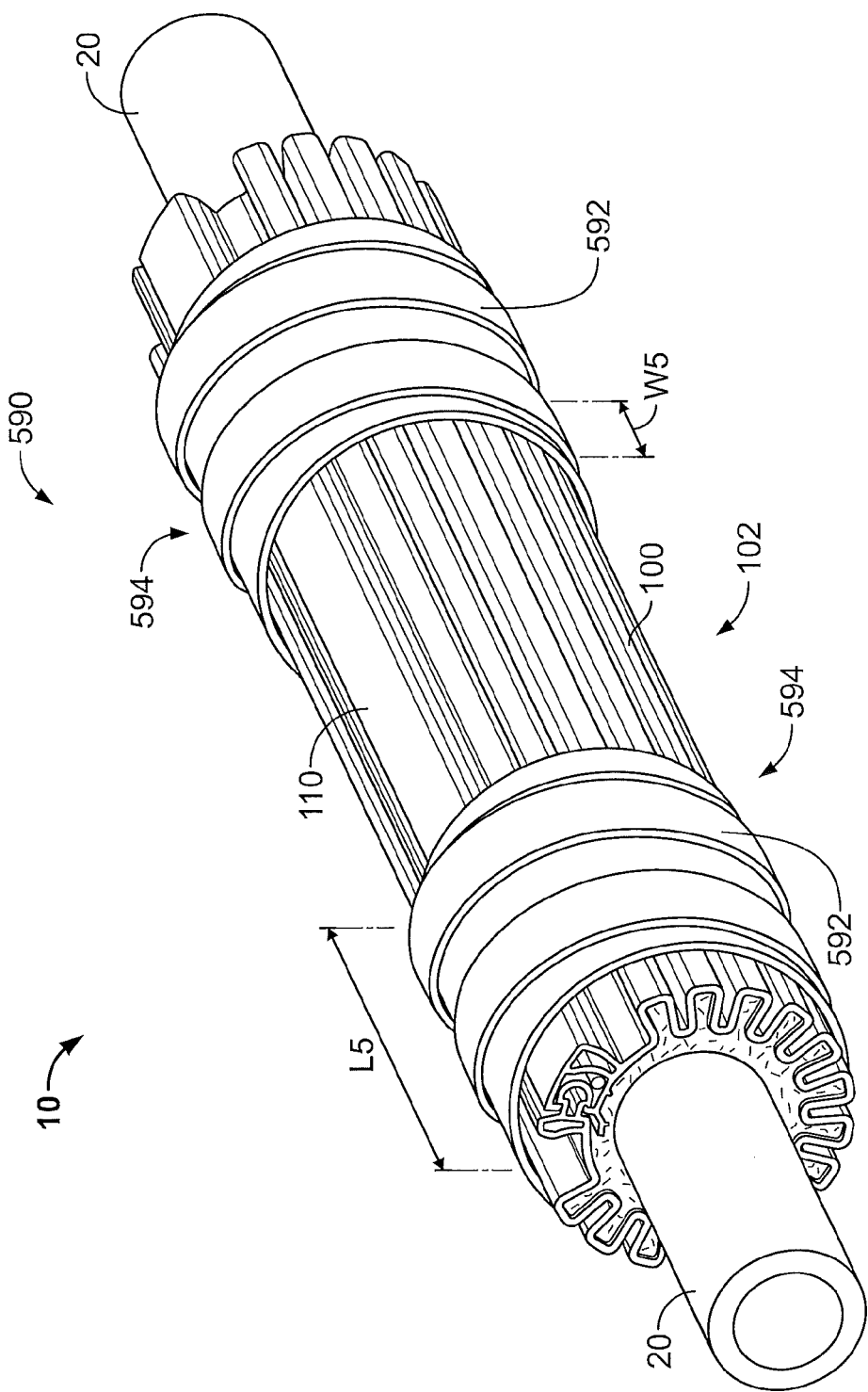
FIG. 15 is a perspective view of the cover assembly of FIG. 7 with an alternative compression system according to embodiments of the present invention.

With reference to FIG. 15, a compression system 590 according to further embodiments of the present invention is shown therein installed on the cover assembly 102. The compression system 590 includes lengths of compression tape 592 installable on either end of the cover assembly 102 as tape wraps 594.

The compression tape 592 may include any suitable tape. According to some embodiments, the compression tape 592 is a resilient, elastic tape. According to some embodiments, the compression tape 592 includes a self-amalgamating sealing tape. According to some embodiments, the compression tape 592 includes a silicone self-amalgamating tape impregnated with a substrate (in some embodiments, a fabric mesh) that limits the permitted extent of elongation of the tape 592. In some embodiments, elongation of the tape 592 is limited to from about 0 to 25%. Suitable compression tapes may include fusion tape available from Tyco Electronics Corporation. After the sleeve assembly 100 has been installed as discussed above to form the protective cover assembly 102, a length of the compression tape 592 is wrapped tightly around the sleeve assembly 100 and, more particularly, over a respective one of the cable mastic patches 152, 154, to form respective tape wraps 594 as illustrated. According to some embodiments, the tape 592 is spirally wound about the sleeve 110. The tape 592 is deliberately tensioned as it is wrapped about the sleeve so that the tape 592, once installed as a tape wrap 594, applies a radially compressive load on the sleeve 110.

As discussed above, in some embodiments, the compression tape 592 is a resilient, elastic tape. During installation, the tape 592 is elastically elongated so that, once applied to the sleeve assembly 100 as a tape wrap 594, the tape 592 continues to persistently apply a radially compressive load to the underlying components 20, 152, 154, 110 (i.e., a hoop stress is retained in the tape wrap 594). This compressive loading presses the sleeve 110 into intimate and compressive contact with the cable mastic patches 152, 154. In this manner, the engagement and thereby the seals between each cable mastic patch 152, 154 and the cables 20 and the sleeve 110 are maintained and reinforced. The tape wraps 594 thus serve as pre-loaded pressure applying or biasing tapes after installation. According to some embodiments, each tape wrap 594 applies a persistent radially compressive load in the range of from about 5 to 25 kPa.

According to some embodiments, the tape wraps 594 are fully disposed between the end edges 124, 126 of the sleeve 110 and do not hang off of the sleeve 110 or directly engage the cables 20.

According to some embodiments, the width W5 of each tape 592 is in the range of from about 2 to 7 cm. According to some embodiments, the length L5 of each tape wrap 594 is in the range of from about 5 to 15 cm.

Figure 16:
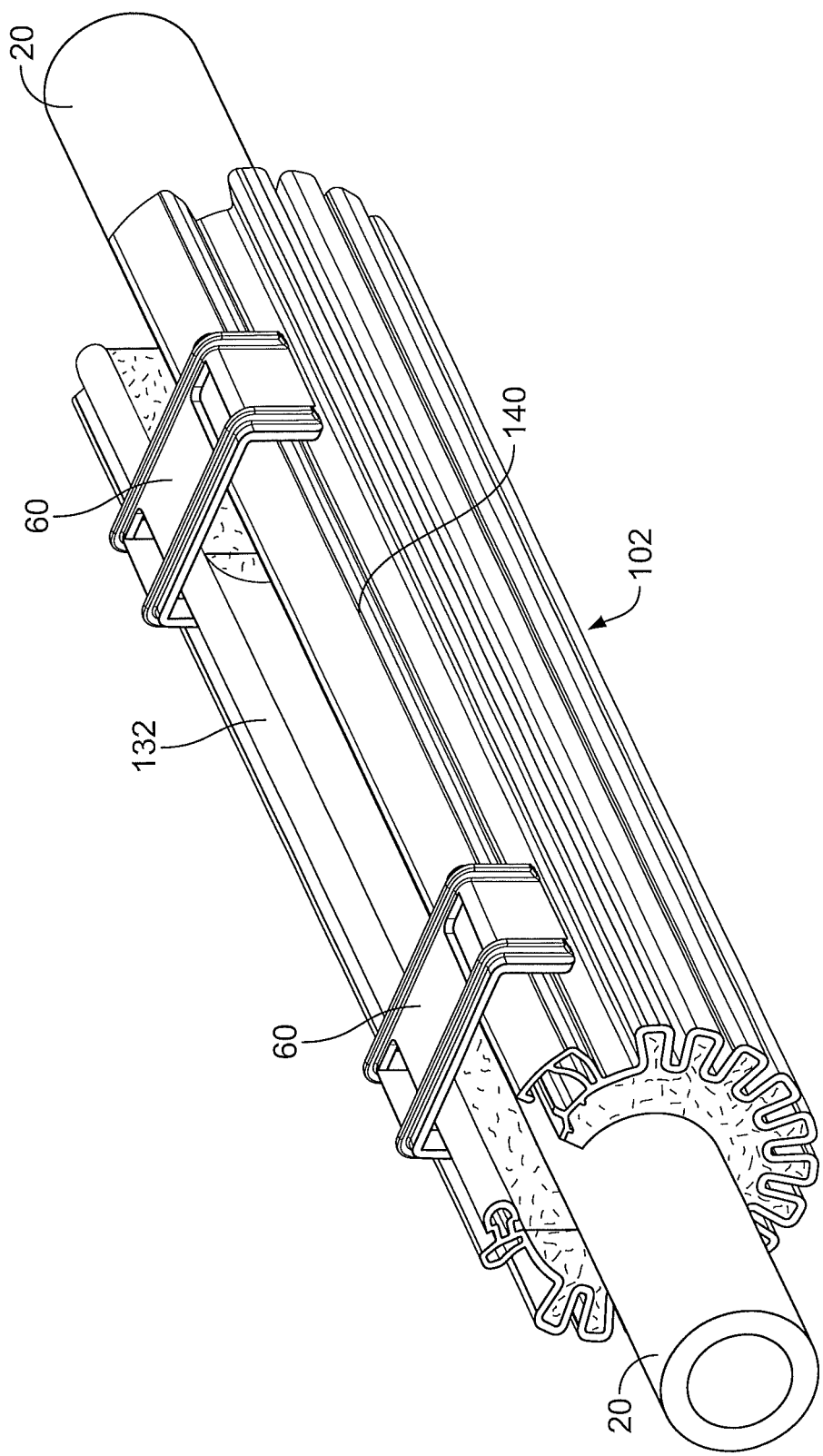
FIG. 16 is a perspective view of the cover assembly of FIG. 7 with a pair of pre-latch clips installed thereon.

In order to assist the installer, one or more pre-latch clips 60 may be used to temporarily hold the longitudinal edge portions 120, 122 (and the connector portions 132, 140) proximate one another as shown in FIG. 16. With the clips 60 providing a "third hand", the installer can more easily interlock the connector portions 132, 140. After the connector portions 132, 140 have been interlocked (or after one or more supplemental compression members have been installed), the clip 60 can be removed.

Figure 17:
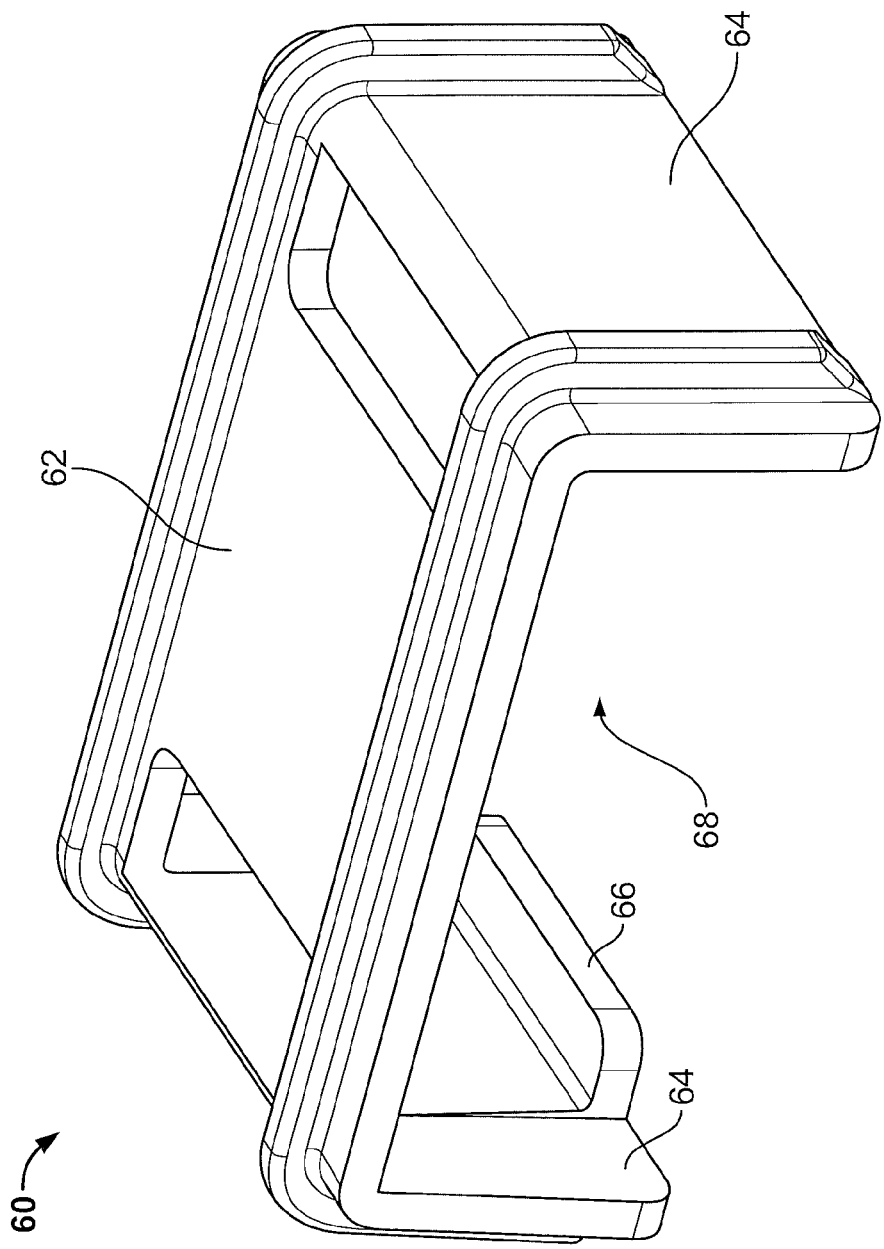
FIG. 17 is an enlarged, top perspective view of the pre-latch clip of FIG. 16.
Figure 18:
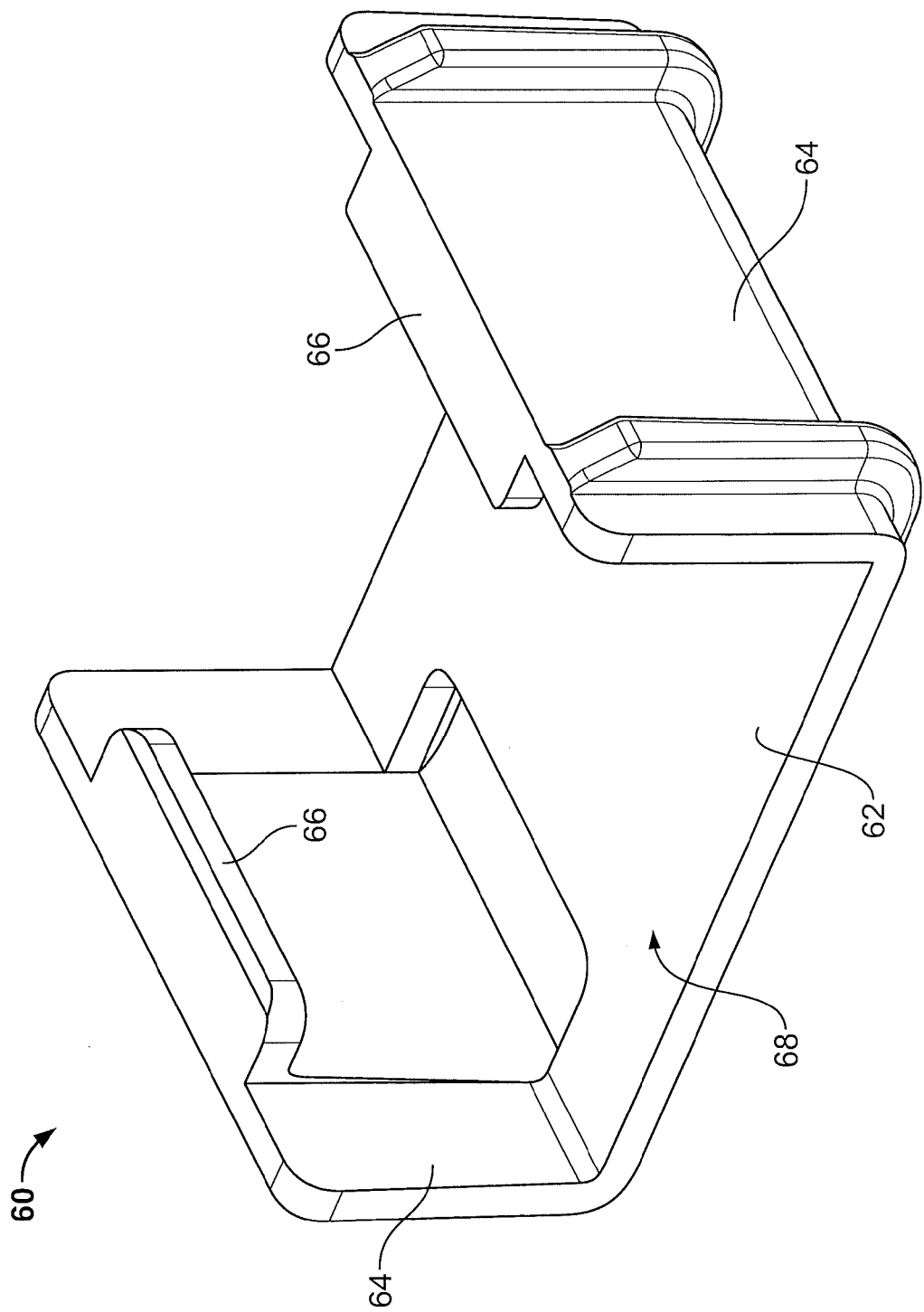
FIG. 18 is an enlarged, bottom perspective view of the pre-latch clip of FIG. 16.

With reference to FIGS. 17 and 18, a pre-latch clip 60 is shown therein. The pre-latch clip 60 has a body 62, depending side legs 64 and tabs 66 collectively defining a clip channel 68. In use, the connector portions 132, 140 are received in the channel 68 and the tabs 66 nest under the grip surfaces 134A, 142A to secure the clip 60 in place.

Sleeve assemblies and cover assemblies as described herein provide range taking (e.g., corrugated) cold-applied, wrap-around sleeves for creating an environmental seal about a cable splice or the like (e.g., for re jacketing the splice). Circumferential cable sealing mastic patches 152, 154 can provide environmental seals about the cables that will withstand relatively high cable temperatures in service as reflected in IEEE Std. 404-2006 while nonetheless permitting the creation of an effective seal using a cold-applied installation. In particular, semi-crosslinked mastic patches 152, 154 can provide these dual benefits. Hot pressing the mastic cable mastic patches 152, 154 as disclosed herein can ensure that the cable mastic patches 152, 154 adequately conform and adhere to the corrugated interior surface of the wrap-around sleeve to provide a sufficient sealing engagement therewith in service. The closure mastic strip 160 can provide a longitudinal environmental seal to fully environmentally encapsulate the cable section.

Compression members and systems (e.g., the compression systems 270, 380, 480, 590) as disclosed herein can compress the circumferential mastic seals 152, 154 to improve their integrity, particularly when the cover assembly 102 is subjected to temperature fluctuations in service that cause the cables 20 and/or the sleeve 110 to expand and contract. In some embodiments, the compression members may only be needed to move the mastic patches 152, 154 into contact with the cables 20 for a limited time to bond the mastic seals 152, 154 to the cables 20 and could be removed or could no longer be required to maintain an adequate seal.

According to some embodiments, the cable mastic patches 152, 154, and the closure mastic strip 160 provide a moisture seal for the cable chamber 104. According to some embodiments, the installed cover assembly 102 is fully compliant with IEEE Std. 404-2006 (IEEE Standard for Extruded and Laminated Dielectric Shielded Cable Joints Rated 2500V to 500,000V). In particular, the cable mastic patches 152, 154 are composed and configured such that they do not permit ingress of water or contaminants about the cables 20 in violation of IEEE Std. 404-2006.

While the preferred embodiments described herein illustrate specific connecting portion configurations, it is to be understood that various suitable connecting portion configurations understood by those skilled in the art may be used.

While the illustrated embodiment of FIG. 1 shows the rib and socket members to be integrally formed with the longitudinally extending portion, rib and socket members of the present invention may be coupled to first and second longitudinal edge portions by various means as will be understood by those skilled in the art. Rib and socket members may also be coupled to the first and second longitudinal edge portions by bonding the rib and socket members to the first and second longitudinal edge portions. The bonding may be done in various ways as will be understood by those skilled in the art. When the rib and socket members comprise materials different from those of the longitudinally extending portion, the bonding is preferably accomplished by coextruding the rib and socket members with the longitudinally extending portion.

Although the illustrated embodiments have shown particular mechanical connectors, it is to be understood that connectors of the present invention may be any suitable connector as will be understood by those skilled in the art. For example, connectors of the present invention may be mechanical connectors having different configurations, chemical connectors (e.g., adhesives), and the like.

In accordance with some embodiments of the present invention compression, systems (e.g., the compression systems 270, 380, 480, 590) as disclosed herein can be used with other types of cold-applied, wrap-around sleeves (e.g., using gel sealants rather than mastic sealants).

In accordance with some embodiments of the present invention compression, the closure mastic strip 160 may be composed of a sealant other than a mastic. For example, the strip 160 may instead be a gel sealant or caulk type adhesive.

According to some embodiments, the cable mastic patches 152, 154 may be formed of a mastic that is not semi-crosslinked. According to some embodiments, the cable mastic patches 152, 154 may be replaced with non-mastic sealant patches such as patches or masses of gel sealant.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A wrap-around cable sleeve assembly for environmentally sealing a cable section, the wrap-around cable sleeve assembly comprising:
   a wrap-around sleeve having a longitudinally extending portion and opposed first and second longitudinal edges, wherein the longitudinally extending portion defines a portion of a cable chamber extending around the cable section when the wrap-around sleeve is wrapped around the cable section;
   a cable mastic patch on an interior surface of the longitudinally extending portion and extending transversely across the longitudinally extending portion, wherein the cable mastic patch is configured and positioned to engage the cable section and form a continuous environmental circumferential seal about the cable section when the wrap-around sleeve is wrapped around the cable section; and
   a longitudinally extending closure mastic strip mounted on the wrap-around sleeve adjacent the second longitudinal edge and configured and positioned to environmentally seal the first and second longitudinal edges of the wrap-around sleeve when the wrap-around sleeve is wrapped around the cable section;
   wherein the closure mastic strip is softer than the cable mastic patch at all temperatures in a prescribed operating temperature range of the wrap-around cable sleeve assembly.

2. The wrap-around cable sleeve assembly of claim 1 wherein the cable mastic patch is a semi-crosslinked mastic.

3. The wrap-around cable sleeve assembly of claim 1 wherein the wrap-around cable sleeve assembly is a cold-applied cable cover assembly.

4. The wrap-around cable sleeve assembly of claim 1 including a second cable mastic patch on an interior surface of the longitudinally extending portion and extending transversely across the longitudinally extending portion, wherein the second cable mastic patch is configured and positioned to engage the cable section and form a second continuous environmental circumferential seal about the cable section when the wrap-around sleeve is wrapped around the cable section, wherein the second cable mastic patch is longitudinally spaced apart from the first cable mastic patch.

5. The wrap-around cable sleeve assembly of claim 1 including a connector system comprising:
   a first connector portion extending along the first longitudinal edge of the wrap-around sleeve and including an insert member; and
   a second connector portion extending along the second longitudinal edge of the body member and having a socket configured to receive the insert member when the wrap-around sleeve is wrapped around the cable section; and
   wherein the closure mastic strip is disposed in the socket.

6. The wrap-around cable sleeve assembly of claim 1 wherein the cable mastic patch and the closure mastic strip sealingly contact each other when the wrap-around sleeve is wrapped around the cable section.

7. The wrap-around cable sleeve assembly of claim 1 wherein the longitudinally extending portion includes corrugations and an interior corrugation surface, and the cable mastic patch conforms to the interior corrugation surface.

8. The wrap-around cable sleeve assembly of claim 1 including a supplemental compression system including a compression member installable about the wrap-around sleeve when the wrap-around sleeve is wrapped around the cable section to apply a radially inward compression load to the cable mastic patch.

9. The wrap-around cable sleeve assembly of claim 8 wherein the compression member includes a cable tie.

10. The wrap-around cable sleeve assembly of claim 8 wherein the compression system further includes an anchor member positionable on the wrap-around sleeve, wherein the anchor member is configured to mechanically engage the wrap-around sleeve and the compression member to limit relative movement between the wrap-around sleeve and the compression member.

11. The wrap-around cable sleeve assembly of claim 10 wherein the anchor member includes a plurality of integral pins configured to embed in an outer surface of the wrap-around sleeve to axially and circumferentially secure the anchor member with respect to the wrap-around sleeve.

12. The wrap-around cable sleeve assembly of claim 8 wherein the compression member includes an elastic band.

13. The wrap-around cable sleeve assembly of claim 12 wherein the compression member includes an elastic band mounted on a holdout, and wherein the holdout is selectively removable from the elastic band to permit the elastic band to forcibly radially retract about the wrap-around sleeve.

14. The wrap-around cable sleeve assembly of claim 8 wherein the compression member includes an elastic tape.

15. A method for forming a protected cable assembly to environmentally seal a cable section, the method comprising:
   providing a wrap-around cable sleeve assembly including:
      a wrap-around sleeve having a longitudinally extending portion and opposed first and second longitudinal edges;
      a cable mastic patch on an interior surface of the longitudinally extending portion and extending transversely across the longitudinally extending portion; and
      a longitudinally extending closure mastic strip mounted on the wrap-around sleeve adjacent the second longitudinal edge and configured and positioned to environmentally seal the first and second longitudinal edges of the wrap-around sleeve when the wrap-around sleeve is wrapped around the cable section;
      wherein the closure mastic strip is softer than the cable mastic patch at all temperatures in a prescribed operating temperature range of the wrap-around cable sleeve assembly; and
   wrapping the wrap-around sleeve around the cable section such that the longitudinally extending portion defines a portion of a cable chamber extending around the cable section, the cable mastic patch engages the cable section and forms a continuous environmental circumferential seal about the cable section, and the closure mastic strip environmentally seals the first and second longitudinal edges of the wrap-around sleeve.

16. The method of claim 15 wherein the cable mastic patch is a semi-crosslinked mastic.

17. The method of claim 15 including forming an electrical connection splice between first and second cables, wherein wrapping the wrap-around sleeve around the cable section includes wrapping the wrap-around sleeve around the cable section such that the electrical splice connection is contained in the cable chamber.

18. The method of claim 15 including:
   providing an elastic band mounted on a holdout with the elastic band in a radially elastically expanded state; and
   with the wrap-around sleeve wrapped around the cable section, selectively removing the holdout from the elastic band to permit the elastic band to forcibly radially retract about the wrap-around sleeve to apply a radially inward compression load to the cable mastic patch.

19. The method of claim 15 wherein the cable mastic patch is a semi-crosslinked mastic.

20. A method for forming a wrap-around cable sleeve assembly for environmentally sealing a cable section, the method comprising:

providing a wrap-around sleeve having a longitudinally extending portion and opposed first and second longitudinal edges, wherein the longitudinally extending portion defines a portion of a cable chamber extending around the cable section when the wrap-around sleeve is wrapped around the cable section;

heating a cable mastic patch to a prescribed elevated heated state;

applying the cable mastic patch to an interior surface of the longitudinally extending portion and extending transversely across the longitudinally extending portion while the cable mastic patch is in the prescribed elevated heated state such that the cable mastic patch flows to conform to the interior surface of the wrap-around sleeve; thereafter permitting the cable mastic patch to cool on the interior surface of the wrap-around sleeve;

mounting a longitudinally extending closure mastic strip on the wrap-around sleeve adjacent the second longitudinal edge such that the closure mastic strip is configured and positioned to environmentally seal the first and second longitudinal edges of the wrap-around sleeve when the wrap-around sleeve is wrapped around the cable section;

wherein the cable mastic patch is configured and positioned to engage the cable section and form a continuous environmental circumferential seal about the cable section when the wrap-around sleeve is wrapped around the cable section; and wherein the closure mastic strip is softer than the cable mastic patch at all temperatures in a prescribed operating temperature range of the wrap-around cable sleeve assembly.

21. The method of claim 20 wherein the cable mastic patch is a semi-crosslinked mastic.

22. The method of claim 20 including pressing the cable mastic patch onto the interior surface of the wrap-around sleeve while in the prescribed elevated heated state.

23. The method of claim 20 wherein the longitudinally extending portion includes corrugations and an interior corrugation surface, and placing the cable mastic patch on the interior surface of the longitudinally extending portion includes conforming the cable mastic patch to the interior corrugation surface.

* * * * *